United States Patent
Addleman et al.

(10) Patent No.: US 10,221,321 B2
(45) Date of Patent: Mar. 5, 2019

(54) PAINTABLE HYDROPHOBIC AND LUBRICANT-INFUSED SURFACE COATINGS AND PROCESSES FOR MAKING AND USING SAME

(71) Applicant: BATTELLE MEMORIAL INSTITUTE, Richland, WA (US)

(72) Inventors: Raymond S. Addleman, Benton City, WA (US); Curtis J. Larimer, Richland, WA (US); Christopher A. Barrett, Richland, WA (US); George T. Bonheyo, Sequim, WA (US); Robert T. Jeters, Sequim, WA (US); Eric M. Winder, Sequim, WA (US)

(73) Assignee: Battelle Memorial Institute, Richland, WA (US)

( * ) Notice: Subject to any disclaimer, the term of this patent is extended or adjusted under 35 U.S.C. 154(b) by 451 days.

(21) Appl. No.: 14/839,471

(22) Filed: Aug. 28, 2015

(65) Prior Publication Data

US 2017/0058130 A1    Mar. 2, 2017

(51) Int. Cl.
| | |
|---|---|
| *B05D 1/36* | (2006.01) |
| *B05D 1/12* | (2006.01) |
| *C09D 5/00* | (2006.01) |
| *B05D 5/08* | (2006.01) |
| *C09D 183/04* | (2006.01) |
| *C09D 7/61* | (2018.01) |
| *C08K 7/26* | (2006.01) |
| *C08K 3/36* | (2006.01) |

(52) U.S. Cl.
CPC ............... *C09D 5/00* (2013.01); *B05D 1/12* (2013.01); *B05D 5/08* (2013.01); *C09D 7/61* (2018.01); *C09D 183/04* (2013.01); *C08K 3/36* (2013.01); *C08K 7/26* (2013.01)

(58) Field of Classification Search
USPC .......................... 427/215, 203, 204, 212, 214
See application file for complete search history.

(56) References Cited

U.S. PATENT DOCUMENTS

| | | | |
|---|---|---|---|
| 3,931,428 A | 1/1976 | Reick | |
| 4,913,760 A | 4/1990 | Benson et al. | |
| 4,933,237 A | 6/1990 | Krenceski et al. | |
| 5,674,625 A * | 10/1997 | Takahashi | C03C 17/007 428/142 |

(Continued)

FOREIGN PATENT DOCUMENTS

| | | |
|---|---|---|
| WO | WO01/19932 | 3/2001 |
| WO | WO2012/003004 | 1/2012 |

(Continued)

OTHER PUBLICATIONS

International Search Report and Written Opinion for PCT/US2016/049019 (dated Dec. 16, 2016).

(Continued)

*Primary Examiner* — Cachet I Sellman
(74) *Attorney, Agent, or Firm* — Klarquist Sparkman, LLP

(57) ABSTRACT

Compositions and processes are disclosed for forming hydrophobic coatings and lubricant-infused surface coatings. Coatings may be applied to various substrates without prior chemical or temperature treatment of the substrates and over large and irregular surfaces. Coatings are self-healing, anti-fouling, and have enhanced lifetimes.

18 Claims, 12 Drawing Sheets

(56) References Cited

U.S. PATENT DOCUMENTS

| | | | |
|---|---|---|---|
| 6,117,555 A | 9/2000 | Fugimori et al. | |
| 6,210,750 B1* | 4/2001 | Cho | C03C 17/42 |
| | | | 427/190 |
| 6,326,111 B1 | 12/2001 | Chambers et al. | |
| 6,495,624 B1 | 12/2002 | Brown | |
| 6,800,354 B2* | 10/2004 | Baumann | B08B 17/06 |
| | | | 428/141 |
| 7,258,731 B2* | 8/2007 | D'Urso | B05D 5/083 |
| | | | 106/2 |
| 7,772,456 B2 | 8/2010 | Zhang et al. | |
| 8,535,779 B1 | 9/2013 | Smith et al. | |
| 8,574,704 B2 | 11/2013 | Smith et al. | |
| 8,580,027 B1* | 11/2013 | Campos | C08K 9/08 |
| | | | 106/287.13 |
| 8,614,003 B2 | 12/2013 | Ma et al. | |
| 8,741,432 B1* | 6/2014 | Campos | C09C 3/12 |
| | | | 427/215 |
| 8,940,361 B2 | 1/2015 | Smith et al. | |
| 9,121,306 B2 | 9/2015 | Aizenberg et al. | |
| 9,121,307 B2 | 9/2015 | Aizenberg et al. | |
| 9,254,496 B2 | 2/2016 | Dhiman et al. | |
| 2005/0112326 A1 | 5/2005 | Nun et al. | |
| 2005/0118433 A1 | 6/2005 | Oles et al. | |
| 2007/0141305 A1* | 6/2007 | Kasai | B05D 5/08 |
| | | | 428/143 |
| 2009/0042469 A1 | 2/2009 | Simpson | |
| 2009/0104347 A1* | 4/2009 | Van Benthem | B05D 5/08 |
| | | | 427/201 |
| 2009/0136741 A1 | 5/2009 | Zhang et al. | |
| 2010/0004373 A1* | 1/2010 | Zhu | C09D 133/08 |
| | | | 524/448 |
| 2010/0035039 A1 | 2/2010 | Jing et al. | |
| 2011/0021698 A1 | 1/2011 | Vyörykkä et al. | |
| 2011/0033663 A1 | 2/2011 | Svec et al. | |
| 2011/0045247 A1 | 2/2011 | Nun et al. | |
| 2012/0052241 A1 | 3/2012 | King et al. | |
| 2012/0058330 A1* | 3/2012 | Smith | C08L 83/04 |
| | | | 428/327 |
| 2014/0106127 A1 | 4/2014 | Lyons et al. | |
| 2014/0147627 A1 | 5/2014 | Aizenberg et al. | |
| 2014/0165263 A1 | 6/2014 | Pham et al. | |
| 2014/0290731 A1 | 10/2014 | Aizenberg et al. | |
| 2014/0290732 A1 | 10/2014 | Aizenberg et al. | |
| 2014/0328999 A1 | 11/2014 | Aizenberg et al. | |
| 2015/0005424 A1 | 1/2015 | Jones et al. | |
| 2015/0152270 A1* | 6/2015 | Aizenberg | A61L 29/085 |
| | | | 210/500.27 |
| 2015/0175814 A1 | 6/2015 | Aizenberg et al. | |
| 2015/0210951 A1* | 7/2015 | Aizenberg | B08B 17/06 |
| | | | 508/107 |
| 2016/0032074 A1* | 2/2016 | Aizenberg | A61L 29/085 |
| | | | 514/772.4 |

FOREIGN PATENT DOCUMENTS

| | | |
|---|---|---|
| WO | WO2012100100 A3 | 7/2012 |
| WO | WO2013115868 A2 | 8/2013 |
| WO | WO2014012039 A1 | 1/2014 |
| WO | WO2014012080 A1 | 1/2014 |
| WO | WO2014/019809 | 2/2014 |
| WO | WO2014035742 A3 | 5/2014 |
| WO | WO 2014/094042 | 6/2014 |
| WO | WO2015/012910 | 1/2015 |

OTHER PUBLICATIONS

Anand, S., et al., Enhanced Condensation on Lubricant-Impregnated Nanotextured Surfaces, ACS Nano, 6, 11, 2012, 10122-10129.

Bhadury, P., et al., Exploitation of Marine Algae: Biogenic Compounds for Potential Antifouling Applications, Planta, 219, 2004, 561-578.

Chen, L., et al., Transparent Slippery Surfaces Made with Sustainable Porous Cellulose Lauroyl Ester Films, Applied Materials & Interfaces, 6, 2014, 6969-6976.

Godwin, L. S., Hull Fouling of Maritime Vessels as a Pathway for Marine Species Invasions to the Hawaiian Islands, Proceedings of a Workshop on Current Issues and Potential Management Strategies, Feb. 12-13, 2003, Honolulu, HI.

Huang, X., et al., Omniphobic Slippery Coatings Based on Lubricant-Infused Porous Polyelectrolyte Multilayers, ACS Macro Letters, 2. 2013, 826-829.

Kim, P., et al., Liquid-Infused Nanostructured Surfaces with Extreme Anti-Ice and Anti-Frost Performance, ACS Nano, 6, 8, 2012. 6569-6577.

Kim, P., et al., Hierarchical or Not? Effect of the Length Scale and Hierarchy of the Surface Roughness on Omniphobicity of Lubricant-Infused Substrates, Nano Letters, 13, 2013, 1793-1799.

Okada, I., et al., High-Transparency, Self-Standable Gel-SLIPS Fabricated by a Facile Nanoscale Phase Separation, ACS Applied Materials & Interfaces, 6, 2014, 1502-1508.

Rykaczewski, K., et al., Mechanism of Frost Formation on Lubricant-Impregnated Surfaces, Langmuir, 29, 2013, 5230-5238.

Scardino, A. J., et al., Mini Review: Biomimetic Models and Bioinspired Surfacesfor Fouling Control, Biofueling, 27, 1, 2011, 73-86.

Schultz, M. P., et al., Economic Impact of Biofouling on a Naval Surface Ship, Biofueling, 27, 1, 2011, 87-98.

Venkatesan, R., et al., Macrofouling Control in Power Plants, Biofouling and Biofilm Processes Section, Water and Steam Chemistry Division, BARC Facilities, Indira Gandhi Center for Atomic Research Campus, Kalpakkam, 603 102, India, 2008, 265-291.

Wong, T. -S., et al., Bioinspired Self-Repairing Slippery Surfaces With Pressure-Stable Omniphobicity, Nature, 477, 2011, 443-447.

Schachter, B., Slimy Business—The Biotechnology of Biofilms, Nature Biotechnology, 21, 2003, 361-365.

Smith, J. D., et al., Droplet Mobility on Lubricant-Impregnated Surfaces, Soft Matters, 9, 2013, 1772-1780.

Daniel, D., et al., "Lubricant-infused micro/nano-structured surfaces with tunable dynamic omniphobicity at high temperatures," *Applied Physics Letters*, 102(23):231603-1-231603-4 (Jun. 2013).

Dickson, M.N., "BioFocus: Slippery Liquid-Infused Porous Surface Coating on Steel Resists Biofouling," *MRS Bulletin*, 41(1):9 (Jan. 2016).

Dyett, B., et al., "Toward Superhydrophobic and Durable Coatings: Effect of Needle vs. Crater Surface Architecture," *ACS Appl. Mater. Interfaces*, 6:9503-9507 (May 2014).

Epstein, A.K., et al., "Liquid-infused Structured Surfaces with Exceptional Anti-biofouling Performance," *Proceedings of the National Academy of Sciences*, 109(33):13182-13187 (Aug. 2012).

Grinthal, A., et al., "Mobile Interfaces: Liquids as a Perfect Structural Material for Multifunctional, Antifouling Surfaces," *Chemistry of Materials*, 26(1):698-708 (Oct. 2013).

Hoshian, S., et al., "Robust Superhydrophobic Silicon without a Low Surface-Energy Hydrophobic Coating," *ACS Appl. Mater. Interfaces*, 7:941-949 (Dec. 2014).

Hou, X., et al., "Preparation of polypropylene superhydrophobic surface and its blood compatibility," *Colloids and Surfaces B: Biointerfaces*, 80:247-250 (Jun. 2010).

Howell, C., et al., "Self-Replenishing Vascularized Fouling-Release Surfaces," *ACS Applied Materials & Interfaces*, 6(15):13299-13307 (Jul. 2014).

Howell, C., et al., "Stability of Surface-Immobilized Lubricant Interfaces Under Flow," *Chemistry of Materials*, 27(5):1792-1800 (Feb. 2015).

International Search Report and Written Opinion for PCT/US2017/014061, 8 pages (dated Apr. 7, 2017).

Karapanagiotis, I., et al., "From Hydrophobic to Superhydrophobic and Superhydrophilic Siloxanes by Thermal Treatment," *Langmuir*, 30:13235-13243 (Oct. 2014).

Kondrashov, V., et al., "Microcones and Nanograss: Toward Mechanically Robust Superhydrophobic Surfaces," *Langmuir*, 30:4342-4350 (Mar. 2014).

(56) References Cited

OTHER PUBLICATIONS

Luong-Van, E., et al., "Review: Micro- and nanostructured surface engineering for biomedical applications," *J. Mater. Res.*, 28(2):165-174 (Jan. 2013).

Mao, C., et al., "Preparation of lotus-leaf-like polystyrene micro- and nanostructure films and its blood compatibility," *J. Mater. Chem.*, 19:9025-9029 (Oct. 2009).

MacCallum, N., et al., "Liquid-Infused Silicone as a Biofouling-Free Medical Material," *ACS Biomaterials Science & Engineering*, 1(1):43-51 (Dec. 2014).

Okada, I., et al., "High-Transparency, Self-Standable Gel-Slips Fabricated by a Facile Nanoscale Phase Separation," *ACS Applied Materials & Interfaces*, 6(3):1502-1508 (2014).

Sun, D., et al., "No Platelet Can Adhere—Largely Improved Blood Compatibility on Nanostructured Superhydrophobic Surfaces," *Small*, 1(10):959-963 (Aug. 2005).

Tesler, A.B., et al., "Extremely Durable Biofouling-Resistant Metallic Surfaces Based on Electrodeposited Nanoporous Tungstite Films on Steel," *Nature Communications*, 6(Article 8649):10 pp. (Oct. 2015).

Tian, et al., "Moving superhydrophobic surfaces toward real-world applications," *Science*, 352(6282):142-143 (Apr. 2016).

Vongsetskul, T., et al., "Antimicrobial nitrile gloves coated by electrospun trimethylated chitosan-loaded polyvinyl alcohol ultrafine fibers," *Polym. Bull.*, 72:2285-2296 (Jun. 2015).

Wang, N., et al., "Fabrication of superhydrophobic and lyophobic slippery surfaces on steel substrate," *Applied Surface Science*, 387:1219-1224 (Nov. 2016).

Wang, P., et al., "Slippery Liquid-Infused Porous Surfaces Fabricated on Aluminum as a Barrier to Corrosion Induced by Sulfate Reducing Bacteria," *Corrosion Science*, 93:159-166 (Apr. 2015).

Xiu, Y., et al., "Mechanically robust superhydrophobicity on hierarchically structured Si surfaces," *Nanotechnology*, 21:155705-155709 (Mar. 2010).

Zhang, P., et al., "Anti-adhesion effects of liquid infused textured surfaces on high temperature stainless steel for soft tissue," *Applied Surface Science*, 385:249-256 (Nov. 2016).

Zhao, Y., et al., "Fabrication of Super-Hydrophobic Surfaces with Long-Term Stability," *Journal of Dispersion Science and Technology*, 32(7):969-974 (Jun. 2011).

Zhu, X., et al., "Robust superhydrophobic surfaces with mechanical durability and easy repairability," *J. Mater. Chem.*, 21:15793-15797 (Sep. 2011).

Zhu, X., et al., "Facile fabrication of a superhydrophobic fabric with mechanical stability and easy-repairability," *Journal of Colloid and Interface Science*, 380:182-186 (May 2012).

\* cited by examiner

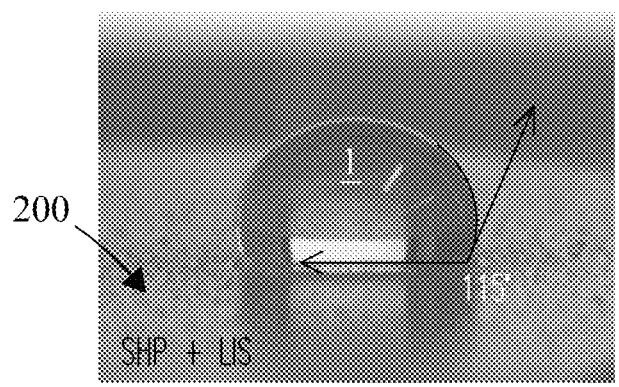
FIG. 8A
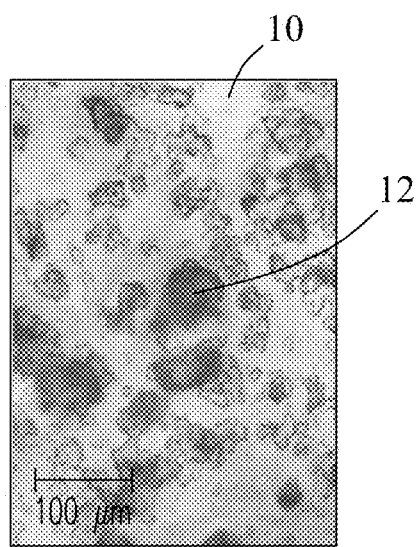 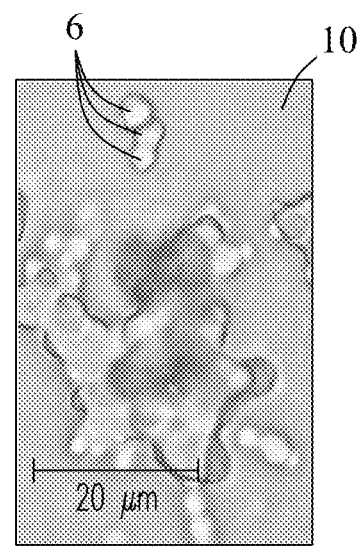
FIG. 8B  FIG. 8C 0 sec   10 sec   40 sec   600 sec 0 sec   10 sec   40 sec   600 sec

PAINTABLE HYDROPHOBIC AND LUBRICANT-INFUSED SURFACE COATINGS AND PROCESSES FOR MAKING AND USING SAME

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

BACKGROUND OF THE INVENTION

A significant and growing need exists for materials that coat surfaces and provide enhanced antifouling or modified wetting behavior. Biofouling refers to the buildup of unwanted organic materials on surfaces in the form of biofilms when the surfaces are exposed to natural or man-made liquid environments. Biofouling and biofilms are costly problems that impact ecological and human health, infrastructure, carbon emissions, and machine performance. For example, over 80% of all infections, including 65% of infections originating in hospitals in the developed world, are estimated to be a result of biofilms. In marine environments, biofilms as thin as 50 μm can increase drag on a ship by 22%. Estimates indicate fouling in marine industries may generate costs greater than $6.4 billion (US) per year. Further, an estimated 70 million tons of additional $CO_2$ is produced by the US Navy as a consequence of increased fuel consumption. In power generation systems, biofilms with a thickness of only 250 μm can reduce heat transfer in heat exchangers by as much as 50%. Economic costs associated with fouling of heat exchangers in power stations in the US alone are estimated to be about $50 billion (US) per year. Many viable antifouling coatings deliver a controlled release of a toxic material to control fouling behavior. However, many of these toxic materials are being outlawed or phased out. Antifouling coatings that do not use these toxic materials include artificial hydrophobic coatings available since the 1990s made from commercial hydrophobic materials. These alternative coatings were inspired by water repellent plants such as the lotus plant and pitcher plant. Leaves of the lotus plant, for example, have a textured surface. When wet, the textured surface traps air beneath the water droplets reducing their ability to wet the surface. Artificial hydrophobic surfaces are synthesized by a variety of methods. Unfortunately, most synthetic hydrophobic materials have a limited durability and lose their ability to repel water with even minor damage to the surface from abrasion or wear. And, current fabrication methods typically involve complex procedures that are expensive and do not scale rendering them unsuitable for mass production or widespread application. A more recent class of coatings known as Liquid-Infused Surface (LIS) coatings include a solid substrate or surface with a liquid layer applied over the solid surface. However, many conventional LIS coatings also currently require complex chemical and physical procedures to generate the porosity in the surface needed to support the liquid layer. And, no current process easily applies functionally robust LIS coatings over large or irregular surfaces, or synergistically combines hydrophobic and LIS coatings in a cost-effective manner. Accordingly, new compositions and processes are needed that easily apply hydrophobic and LIS coatings over large or irregular surfaces, that are functionally robust, and that synergistically combine hydrophobic and LIS coatings in a cost-effective manner. The present invention addresses these needs.

SUMMARY OF THE INVENTION

The present invention includes a paintable hydrophobic coating composition that forms a hydrophobic coating when applied to surfaces and substrates. The term "paintable" encompasses brush painting, roller painting, spray painting, and dip coating.

The hydrophobic coating composition is scalable permitting coatings to be applied to small and large surfaces and substrates.

The hydrophobic coating composition may include particles comprised of a first material of a first selected size and particles comprised of a second material of a smaller size combined together in a selected polymer. First and second particle materials may be selected from silica, metals, metal oxides, ceramics, polymers, diatomaceous earth, and combinations of these materials.

In some embodiments, first particles are porous particles.

In some embodiments, the hydrophobic coatings are super-hydrophobic coatings.

Hydrophobic coatings of the present invention may include selected surface morphologies that provide the coatings with a selected surface energy. In some embodiments, the hydrophobic coating includes a surface energy below about 20 $mJ/m^2$. In some embodiments, the hydrophobic coating provides a water roll-off angle below about 8 degrees.

The present invention also includes a lubricant-infused surface (LIS) coating. The coating may include a base or underlying hydrophobic coating on a substrate. The lubricant may be applied to the surface of the hydrophobic coating to form the LIS coating.

In some embodiments, the base or underlying coating is a hydrophobic coating. In some embodiments, the base or underlying coating is a super-hydrophobic coating.

Particles in the hydrophobic coating and base coating compositions may include various synthetic or naturally-occurring materials described herein.

In some embodiments, particles in the hydrophobic coating may include added antifouling agents, biocidal particles, or other selected agents detailed herein.

Polymers in the hydrophobic coating compositions form the polymer matrix that binds particles in the coating when the compositions are applied (e.g., painted) on a surface or substrate.

In some embodiments, coating compositions may include an added solvent such as hexane that allows the viscosity of the composition to be tailored for application or delivery to the substrate. Added solvent also delays polymerization of the matrix polymer until coating compositions are applied or delivered to the substrate. Hydrophobic coating compositions may be delivered without a prior chemical or physical treatment of the substrate.

In some embodiments, hydrophobic coating compositions may be delivered to the substrate in a selected solvent, fluid, gas, or combination of these dispensing agents. In some embodiments, hydrophobic coating compositions may be delivered or applied to the substrate in the form of a paint.

In the exemplary embodiment, components of the coating compositions including particles and matrix polymers are non-toxic.

The present invention also includes a process for forming the hydrophobic coating. The process may include delivering the hydrophobic coating composition to a substrate to form a hydrophobic coating. Particles in the coating provide the coating with a selected surface morphology that gives the surface a selected surface morphology, surface energy, or roll-off angle. The surface morphology of the coating may include mounded features comprised of aggregates of the larger porous particles. Mounded features may include selected heights and selected diameters. Larger porous particles in the coating further define the microstructure of the coating. Mounded features may be overlaid with smaller features comprised of the second smaller particles in the coating that overlay (i.e., are on top of) the larger mounded features and give the coating a nanoscale surface texture (nanotexture). The nanoscale surface texture supports and stabilizes lubricants at the surface of the coating when applied or delivered as described further herein.

The present invention also includes a process for forming a lubricant-infused surface (LIS) coating. In some embodiments, the process includes applying a lubricant to the surface of the hydrophobic coating to form the LIS coating. Lubricants may be in the form of oils, greases, and gels.

In some embodiments, the process includes delivering the lubricant to the surface of the hydrophobic coating from an internal reservoir or wicking structure, or from an external lubricant reservoir. Lubricants when applied or delivered to the hydrophobic coating infuse porous particles at the surface and the sub-surface with lubricant.

Lubricants also infuse interstitial spaces positioned between particles in the sub-surface and between nanoscale particles at the surface of the coating with lubricant.

In some embodiments, hydrophobic coatings underlying the LIS coating may also include pore-forming additives or materials that increase porosity of the LIS coating. Porosity provides storage of the lubricant when applied or delivered to the hydrophobic coating and further maintains or provides continuous delivery or replenishment of the lubricant at the surface of the LIS coating. Lubricants reduce the surface friction of the coated surface and provide the LIS coating with selected and enhanced surface properties.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIGS. 8A-8C present different views of a LIS coating of the present invention.

DETAILED DESCRIPTION

The present invention includes compositions and processes for fabricating hydrophobic coatings and LIS coatings and other coatings with enhanced properties described herein that address needs not previously met in the art. In the following description, embodiments of the present invention are shown and described by way of illustration of the best mode contemplated for carrying out the invention. It will be apparent that various modifications and alternative constructions may be made to the present invention. The present invention is intended to cover all such modifications, alternative constructions, and equivalents falling within the spirit and scope of the invention as defined in the claims. Therefore the description should be seen as illustrative and not limiting.

Figure 1:
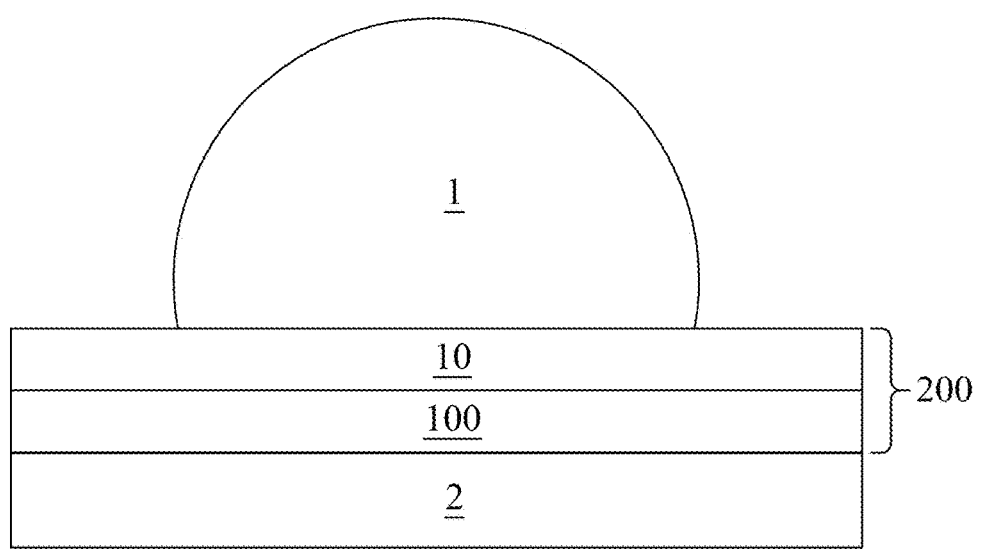
FIG. 1 illustrates an exemplary hydrophobic coating and a LIS coating of the present invention applied to an exemplary substrate.

FIG. 1 illustrates an exemplary process for forming hydrophobic coatings 100 and lubricant-infused surface (LIS) coatings 200 of the present invention. The term "hydrophobic" used herein means the coating provides a contact angle measured between a water droplet and the surface of the coating greater than or equal to about 135 degrees. The term "super-hydrophobic" means the coating provides a contact angle greater than or equal to about 150 degrees. The term "lubricant-infused surface" used herein refers to a coating formed when a lubricant is applied to an underlying coating or first layer on a selected substrate or surface. In different embodiments, the underlying coating may be a hydrophobic coating or a super-hydrophobic coating. The term "lubricant" used herein encompasses both lubricants and slippery liquids. The process may include applying or dispensing a hydrophobic coating composition to a substrate 2 to form the hydrophobic coating 100 on the substrate. The term "substrate" used herein encompasses all substrates, supports, and surfaces onto which coating compositions and coatings of the present invention described herein may be delivered, applied, or introduced. Substrates suitable for use include various supports and surfaces including, but not limited to, for example, textiles such as cotton and canvas; composite materials such as fiberglass; polymer materials; flexible materials such as latex and nitrile rubber; wicking materials such as fiberglass weaves and porous membranes; glass; steel; painted surfaces; coated surfaces, other selected materials, including combinations of these surfaces, materials, and substrates. For example, coating compositions of the present invention may be applied to substantially any surface or substrate to form uniform textured thin films. No limitations are intended.

Coating compositions may be dispensed or applied to a surface or substrate in selected solvents and gases. Solvents may include, but are not limited to, hydrocarbons including, e.g., hexanes and octanes, propanes, butanes, like solvents, and combinations of these solvents. Solvents lower the viscosity of the composition mixture such that it can be dispensed or painted, for example, by spraying. Dispensing gases include, but are not limited to, compressed gases such as compressed air, $CO_2$, compressed hydrocarbons (e.g., propanes and butanes), and other gases. No limitations are intended. Coating compositions may be applied in a single step without chemical or temperature pretreatment of the receiving surface or substrate enabling easy and rapid application. Coating compositions may be scaled to permit application to small and large coverage areas, and to smooth or uneven surfaces. Particulates in the coating compositions are secured and dispersed within the polymer binder as the polymer cures (e.g., dried) on the surface of the substrate. When cured, the polymer polymerizes and solidifies forming the coating on the surface or substrate. Curing times are not limited.

In some embodiments, hydrophobic coatings may be applied (e.g., painted) to substrates and used alone independent of any other coating.

In some embodiments, hydrophobic coatings may be applied over a tie (or base) coating.

In some embodiments, LIS coatings may be formed by coating a substrate with an underlying (base) hydrophobic coating and then infusing the coating with a lubricant.

Hydrophobic coating compositions of the present invention may include particles of a first material of a first selected size, and particles of a second material of a second smaller size combined in selected matrix polymers. First and second particles may be porous or non-porous. Polymers suitable for use in hydrophobic coating compositions and coatings of the present invention include, but are not limited to, siloxane polymers, silicone elastomers, fluoropolymers, fluorinated silicones, methacrylates; polypropylene; polyethylene; cellulose compounds (i.e., acetate); and combinations of these various polymers. Siloxane polymers may include, but are not limited to, hexamethylcyclotrisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, and dimethylsiloxane.

In some embodiments, the polymer may be a polydimethylsiloxane (PDMS) polymer.

In the exemplary embodiment, quantity of the PDMS matrix polymer may be between about 10% and about 20% by weight. Remainder of the initial composition may be made up of a selected dispensing solvent.

Polymers are preferred that provide a low surface energy to the coating.

The hydrophobic composition may include pore-forming additives (porogens) that enhance pore formation in the polymer matrix of the hydrophobic coating when applied to a surface or substrate. Pore-forming additives are selected that maintain the chemical and mechanical stability of the hydrophobic coating. Pore-forming additives may be mixed into the hydrophobic coating composition prior to application to the substrate before curing or drying. Pore-forming additives suitable for use include, but are not limited to, block co-polymers, carboxymethylcellulose (CTAB), sugars, starches, salts, surfactants, micelle-forming surfactants, sodium dodecyl sulfate (SDS), and combinations of these materials. In some embodiments, the pore-forming additive may be a sugar, a starch, or a salt. Sugars, starches, and salts are not limited. Increase in porosity within the matrix polymer of the coating is a function of the quantity of the pore-former added to the coating composition. Pore size is defined and controlled by the size (diameter) of the particles used, for example, from angstroms to microns (μm). Added pores enhance the porosity present in the hierarchical structure of the hydrophobic coating. Sugars, starches, and salts, for example, are available in a wide range of particle sizes from coarse (e.g., millimeters) to fine (e.g., angstroms). Exemplary particle sizes for sugars include: powdered (~70 μm to 250 μm); granulated (~400 μm to 500 μm); coarse (~1000 μm to 1100 μm), or very coarse (~1500 μm to 1800 μm). No limitations are intended.

In some embodiments, pore-forming additives may be surfactants that include R-groups including, e.g., fluorophilic groups, lipophilic groups, and/or water-soluble groups that enable dispersion in the polymer.

Porosity added within the coating structure can provide beneficial properties including increased storage capacity for lubricant infused into the coating. Pores also improve the flow of lubricant through the system of interconnected open pores enabling transfer of lubricant to the surface of the coating. Increasing the capacity and transfer of lubricants in the LIS coating increases the lifetime, performance, and self-healing properties of the LIS coatings. Porosity within the polymer matrix of the coating may be scaled up or down for specific applications by controlling the quantity of pore former added to the hydrophobic coating composition.

Pore-forming additives added to the coating compositions can be removed from the resulting hydrophobic coating to enhance the number of open pores (i.e., porosity) in the coating available for infusion by lubricants. Pore-forming additives may be removed from the coating after curing or drying the coating. In various embodiments, pore-forming additives may be removed from the coating, for example, by thermal extraction, by liquid extraction (e.g., with water and other solvents), with selected surfactants, and other reactive chemicals. No limitations are intended.

Applying or delivering a lubricant 10 to the surface of the hydrophobic (e.g., a superhydrophobic) coating 100 forms the LIS coating 200.

In some embodiments, the underlying hydrophobic coating 100 may include a wicking material 24 described further herein (see FIG. 9A) positioned in contact with the substrate 2 that delivers a lubricant 10 from an internal or external lubricant reservoir (see FIG. 9B) to the surface of the hydrophobic coating forming the LIS coating 200.

In various embodiments, coating compositions and lubricants may be applied or dispensed to substrates with methods including, but not limited to, painting, brushing, brush painting, brush-coating, roller painting, spray-coating, spray painting, air-brushing, dip coating, including combinations of these various application methods. All scalable surface painting and coating approaches that yield the textured surface morphology of the hydrophobic coatings described herein may be used without limitation.

Coatings of the present invention are functionally robust and can synergistically combine hydrophobic and LIS properties. Coatings may be used alone without further chemical treatment or as a component of the LIS coating described further herein.

In some embodiments, substrates may be pretreated to improve binding of the coating composition to the substrate or surface. Pretreatment of the surface or substrate may include methods such as cleaning, sanding, or air drying. Pretreatment may also include coating the surface or substrate with a primer or tie coat that maximizes adhesion of the coating composition on surfaces or substrates that may not have an optimum chemical compatibility. Tie coats include, but are not limited to, polyurethanes and silicone elastomers that provide a transition from an undercoat or primer coat to a finish coat suitable for application of the hydrophobic coating and the LIS coating. However, the invention is not intended to be limited to applications that involve or require pretreatment. No limitations are intended.

Figure 2A:
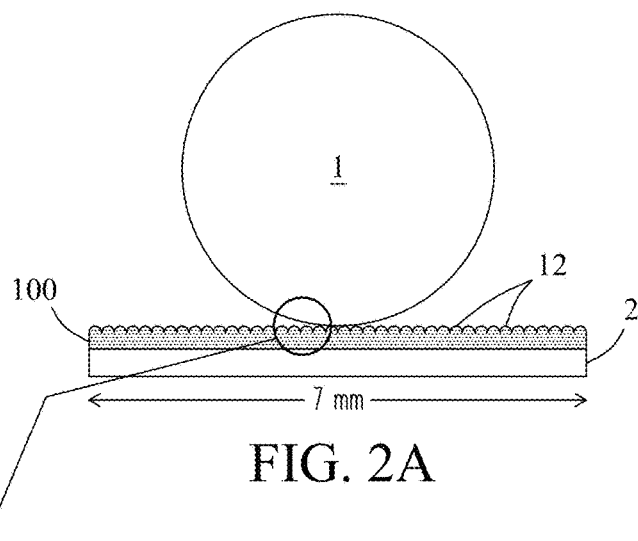
FIGS. 2A-2C illustrate different views of an exemplary hydrophobic coating of the present invention.

FIG. 2A illustrates a cross-sectional view of an exemplary hydrophobic coating 100 of the present invention. The hydrophobic coating includes protruding (mounded) surface features 12 comprised of a first porous particulate material described further in reference to FIG. 2B. Porous surface features 12 in the hydrophobic coating are overlaid with a textured surface comprised of a second particulate material description hereafter in reference to FIG. 2C that supports water and other liquids in the form of droplets 1 above the surface of the coating and prevents the liquids from wetting the underlying surface. The hydrophobic coating is also designed to support and stabilize a Lubricant detailed further herein when dispensed or applied to the hydrophobic coating.

Figure 2B:
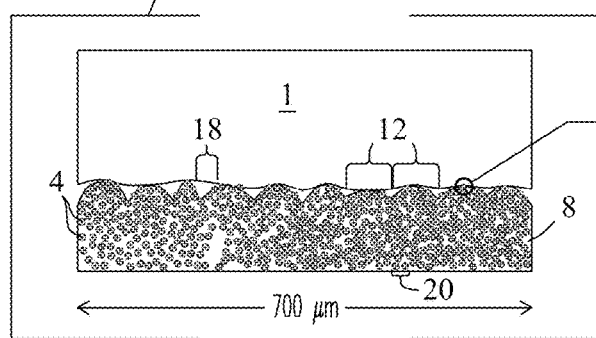

FIG. 2B is an expanded view of the hydrophobic coating 100 of FIG. 2A showing the sub-surface microstructure of the coating. Microstructure of the coating stems from the first particulate material (particles) 4 in the coating. First particulate materials may include synthetic or naturally-occurring materials including, but not limited to, silica, diatomaceous earth, metals, metal oxides (e.g., alumina and titania), ceramics, porous carbons, polymers, and combinations of these various particulate materials. Particles 4 may be porous (e.g., mesoporous and/or nanoporous particles) and/or non-porous. In some embodiments, the first particulate material may include mesoporous silica particles such as MCM-41® and/or nanoporous silica particles. Particles 4 also provide the coating with a selected surface morphology. For example, in the exemplary embodiment, mound features 12 at the surface of the coating are composed of aggregates of the first particulate material 4. In the figure, particles 4 in the hydrophobic coating may be fixed in a polymer matrix 8 comprised of selected polymers described herein.

Hydrophobic coating 100 may also include interstitial spaces 18 positioned between mound (i.e., particle aggregate) features 12 at the surface of the coating. Interstitial spaces 20 may also be located between adjacent particles 4 in the sub-surface of the coating. As shown in the figure, polymer 8 that forms the matrix of the coating fills interstitial spaces 18 and 20. Interstitial spaces may vary widely in size depending on whether the space is between the mound features or between particles. Interstitial spaces 18 between features 12 may be of a size up to about 250 um. Interstitial spaces 20 between particles may be about the same size as the particles between about 1 um to about 100 um. However, no limitations are intended.

Quantities of the first particles in the hydrophobic coating are not limited. In some embodiments, the hydrophobic coating composition may include a quantity of mesoporous silica particles between about 5% and about 25% by weight prior to dilution in the dispensing solvent (e.g., hexane), but compositions are not intended to be limited thereto.

In one exemplary embodiment, the hydrophobic coating composition prior to dilution in a delivery solvent may include percentages of the following major components: 64% PDMS (polymer), 12% MCM-41® (first particulate material), and 24% CAB-O-SIL® H-5 (second particulate material) by weight.

In another exemplary embodiment, the hydrophobic coating composition may include a sprayable or paintable form prepared in a dispensing solvent (e.g., hexane) with percentages of major components including: 90.9% hexane, 5.8% PDMS (polymer), 1.1% MCM-41® (first particulate material), and 2.2% CAB-O-SIL® H-5 (second particulate material) by weight.

In another exemplary embodiment, the hydrophobic coating composition may include a sprayable or paintable form prepared in a dispensing solvent with quantities of major components including: 25 g hexane, 1.6 g PDMS (polymer), 0.3 g MCM-41® (first particulate material), and 0.6 g CAB-O-SIL® H-5 (second particulate material). However, quantities of first and second particulate materials in the hydrophobic coating are not intended to be limited.

In some embodiments, first particles may include a larger size (diameter) from about 0.01 μm to about 40 μm.

In a preferred embodiment, first particles may include a size up to about 5 μm. In some embodiments, first particles may include a size between about 0.01 μm to about 5 μm.

In embodiments requiring optical transparency, particles may include a size below about 0.4 μm. In some embodiments, particles may include a size between about 0.1 μm to about 0.4 μm.

Figure 2C:
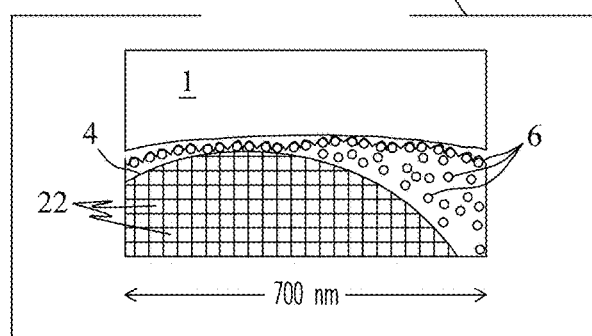

Lubricants described hereafter in reference to FIG. 2C when applied or delivered to the surface of the hydrophobic coating 100 wick into interstitial spaces 20 positioned between mesoporous and nanoporous (first material) particles 4 within the polymer matrix 8, into pores within the polymer matrix, and into internal pores 22 within these particles.

FIG. 2C is an expanded view of the hydrophobic coating 100 of FIG. 2A showing the nanostructure of the coating below the surface. Nanostructure of the coating stems from smaller (second) particles 6 in the coating. Particles 6 may be composed of synthetic or naturally-occurring materials described previously. Particles 6 may also be porous or non-porous. Smaller particles 6 in the coating overlay (i.e., are atop of) the mounded features 12 at the surface of the coating providing the surface with a nanotexture that supports lubricants at the coating interface when the lubricants are applied, delivered, or otherwise introduced to the hydrophobic coating. The term "supports" refers to the ability of particles located at the surface of the coatings to hold or retain lubricants when applied or delivered at or above the surface of the coating. The term also means particles within the coating can be infused by low-energy lubricants when the lubricants are applied or delivered to the surface of the coating.

Mounded features 12 at the surface of the hydrophobic coating are comprised of aggregates of larger (first) particles 4 described previously. Larger particles 4 may be porous particles that include internal pores 22 of various sizes (e.g., mesopores and/or nanopores) that provide capacity (i.e., lubricant reservoirs) for storage of lubricants when lubricants are applied, delivered, or introduced at the surface of the hydrophobic coating. Internal pores and other porous features within the underlying hydrophobic coating also serve to stabilize lubricants on the surface of the coating. The term "stabilizes" as used herein refers to the ability of particles in the hydrophobic coatings described herein to retain lubricants when applied or delivered to the surface of the coatings such that the lubricants are not easily or readily removed from the surface of the coatings.

Porous particles used in the hydrophobic coating compositions and coatings help stabilize (i.e., retain) the lubricant on the surface of the hydrophobic coating when applied or delivered. Porous particles may include selected pore sizes. Pore sizes are preferred that are sufficiently large to wick lubricants into the pores and sufficiently small to prevent lubricants from easily leaching out of the pores. Porosity of the coating may be tailored by selection of particle size, pore size, pore volume, and pore density of the particulate materials and the quantity of other porous features introduced in the polymer matrix, for example, by addition of pore-forming materials described herein. In some embodiments, porosity may be selected up to about 83% by volume. However, no limitations are intended.

In some embodiments, pore size may be selected between about 1 nm to about 1 μm. In some embodiments, pore size for stabilization of lubricants may be selected between about 1 nm to about 200 nm. In some embodiments, pore size may be selected between about 3 nm to about 30 nm. In some embodiments, pore size may be selected between about 3 nm to about 500 nm. In some embodiments, pore size may be selected between about 5 nm to about 50 nm. In one embodiment, pore size may be about 9 nm. Pore sizes are exemplary only and not intended to be limiting.

Smaller (second) particles may be composed of synthetic or naturally-occurring materials including, but not limited to, silica, metals, metal oxides such as alumina and titania, diatomaceous earth, ceramics, polymers, and other particulates, including combinations of various materials. Exemplary materials described herein are not intended to be limiting. In some embodiments, the smaller particles may be composed of non-porous fumed silica particles or nanofibers such as CAB-O-SIL® H-5, which is composed of fiber-like chains or nanoparticles of silica. In some embodiments, smaller particles may include a size (diameter) up to about 40 nm. In some embodiments, smaller particles may include a size between about 7 nm to about 20 nm. In some embodiments, smaller particles may include a size between about 1 nm and about 50 nm. In some embodiments, smaller particles may include a size between about 1 nm to about 100 nm. In some embodiments, smaller particles may include a size selected between about 30 nm to about 100 nm. In some embodiments, smaller particulate fibers may include a length up to about 500 nm. Again, particle sizes are exemplary and not intended to be limiting.

First and second particulate materials may be modified to include selected surface chemistries that aid dispersion in the polymer matrix, improve bonding with the polymer, reduce clumping in the coating, and/or assist stabilization of lubricants when applied or delivered to the surface of the coating.

In some embodiments, porosity within the hydrophobic coating or LIS coating may be infused with liquid biocides that provide the coatings with biocidal and anti-fouling properties. Biocides suitable for use include, but are not limited to, for example, copper; copper oxides; copper salts; copper bis(1-hydroxy-2(1H)-pyridinethionato-O; zinc ethylenebis; zinc dimethyl dithiocarbamate/ziram; napthenic acids; pyridine-triphenylborane; zinc 2-pyridinethiol-1-oxide/pyrithione zinc; 3-(3,4-Dichlorophenyl)-1,1-dimethyl urea/diuron; pyridine-triphenylborane; 2,3,5,6-Tetrachloro-4-(methylsulphonyl) pyridine; N-(2,4,6-Trichlorophenyl) maleimide; dichloro-N-[(dimethylamino)sulphonyl]; fluoro-N-(p-tolyl)methanesulphenamide/tolylfluanid; N,N-dimethyl-N-phenyl-N-(dichlorofluoromethylthio) sulfamide/dichlofluanid; 2-methylthio-4-tert-butylamino-6-cyclopropylamino-striazine; 4,5-dichloro-2-n-octyl-4-isothiazol in-3-one; 2,4,5,6-tetrachloroisophthalonitrile; tetramethylthiuram disulphide, and combinations of these various biocides. Biocides can also be dissolved in LIS lubricants used to infuse the open porosity within the hydrophobic coating. In some embodiments, biocides soluble in LIS lubricants may include fluorocarbon functional groups. Biocides with fluorocarbon functional groups soluble in LIS lubricants include fluorocarbon metal chelates such as hexafluoroacetylacetonate copper complexes and hexafluoroacetylacetonate tin complexes. No limitations are intended.

In some embodiments, biocides added to the coating composition may be in the form of biocidal particles. In some embodiments, biocidal particles may be added as structural components of the coating compositions such as, for example, porous biocidal particles used as a first particulate material. Exemplary biocidal particles used as a first particulate material in the coating may include larger porous particles of copper and silver. In some embodiments, smaller biocidal particles may be added as structural components of the coating compositions such as, for example, small or fine (i.e., nanometer-scale) biocidal particles used a second particulate material. Exemplary biocidal particles used as a second particulate material in the coating may include nanoparticles of silver, copper, and stabilized micellular organic biocides all dispersible within the polymer matrix of the coating. No limitations are intended by the disclosure of exemplary materials.

In some embodiments, particles in the hydrophobic composition may include solid particles including porous and non-porous particles containing inorganic or organic biocides, metals (e.g., copper and silver), and other materials that impart anti-fouling properties to the hydrophobic coating.

Hydrophobic coatings may include selected, non-limiting thicknesses. Minimum thickness is about the radius of the first particulate material in the coating, i.e., about 1 μm. However, no limitations are intended. For example, in some embodiments, thicknesses may be about 50 nm. In some embodiments, thicknesses may range from about 0.2 μm to about 2 mm. In some embodiments, thicknesses may be between about 0.1 μm to greater than 2 mm. In some embodiments, thicknesses may between about 5 μm to about 10 μm.

Properties of the hydrophobic coating include, but are not limited to, a water contact angle exceeding 150°, a low water roll-off angle, and a low surface energy. Properties are attributed to the composition and structure described herein. In some embodiments, the hydrophobic coating provides a water roll-off angle less than about 10 degrees. Surface energies for coated surfaces may be calculated using the Owens-Wendt equation [Owens, D. K.; Wendt, R. C., *J. Appl. Polym. Sci.* 1969, 13(8), 1741-1747] by measuring contact angles for a polar liquid (e.g., water) and for a non-polar liquid (e.g., diiodomethane) on the surface of the coating. In various embodiments, hydrophobic coatings when applied to substrates provide a surface energy below about 20 mJ/m$^2$. In some embodiments, surface energy is between about ~2 mJ/m$^2$ and about 15 mJ/m$^2$. Hydrophobic coatings of the present invention may also include wicking materials or other fibrous or porous components that aid retention of lubricants when applied to the surface of the hydrophobic coating, described further in reference to FIGS. 9A-9B below.

Figure 3A:
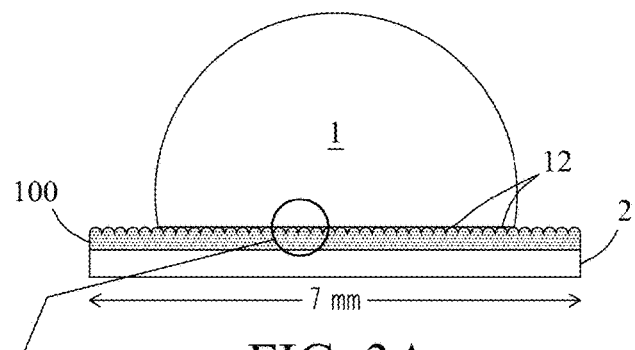
FIGS. 3A-3C illustrate different views of an exemplary LIS coating of the present invention.

FIG. 3A illustrates a cross-sectional view of the surface of an exemplary LIS coating 200 of the present invention. In this embodiment, the LIS coating includes the hydrophobic coating described previously and a lubricant 10 that is applied, delivered, or introduced to the surface of the hydrophobic coating. Lubricants enhance properties of the hydrophobic coated surface and may exhibit properties of both the hydrophobic coating and the lubricant. In the figure, the LIS coating is shown supporting a water droplet 1, which prevents the water droplet from wetting the underlying surface. Mound features 12 at the surface of the hydrophobic coating, with their nano-textured surfaces, support and stabilize the lubricant 10 as a layer on the surface of the hydrophobic coating when the surface is exposed to flowing liquids, water, other media, pressure, or centripetal forces.

In some embodiments, the lubricant may be a fluorocarbon polymer comprised of a fluorine homopolymer of hexafluoropropylene epoxide (e.g., KRYTOX®. Dupont, Wilmington, Del., USA) of the following general formula [1]:

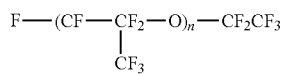

[1]

Within any volume of the lubricant, the lubricant polymer may include a number of monomer units (n) from about 10 to about 60. The polymer chain may be saturated so as to contain only the elements of carbon, oxygen, and fluorine, with no hydrogen present. On a weight basis, typical KRYTOX® oils [CAS registry number is (60164-51-4)] contain 21.6% carbon, 9.4% oxygen, and 69.0% fluorine.

In some embodiments, the lubricant may be a fluorocarbon polymer comprised of polyhexafluoropropylene oxide with the general formula [2]:

F—(CF(CF$_3$)—CF$_2$—O)$_n$—CF$_2$CF$_3$ [2]

Again, the polymer may include a number (n) of monomer units from about 10 to about 60. KRYTOX® greases may include base oils and thickeners such as polytetrafluoroethylene (PTFE) that form the grease. In some embodiments, the lubricant may contain a fluorocarbon polymer with ether functionality including, but not limited to, perfluoropolyether (PFPE), perfluoroalkylether (PFAE) and perfluoropolyalkylether (PFPAE). In some embodiments, the lubricant may include a homopolymer of hexafluoropropylene epoxide.

In some embodiments, lubricant uptake by the hydrophobic coatings can be accelerated by heating the lubricant to between about 60° C. to about 70° C. to lower the viscosity and/or by heating the hydrophobic coating to promote rapid uptake. No limitations are intended.

In some embodiments, a volatile primer solvent such as an alcohol (e.g., isopropanol) can be applied to the hydrophobic coating before lubricant is applied which wets the hydrophobic coating and removes air pockets which facilitates infusion of the lubricant into the hydrophobic coating and subsurface features that serve as lubricant reservoirs therein.

Lubricant may be dispensed until the textured surface and porous features of the hydrophobic coating are saturated. However, delivery of the lubricant is not intended to be limited to saturation conditions only. Saturation is indicated by non-uniform accumulation (e.g., beading) of the lubricant on the surface of the hydrophobic coating.

Lubricants may include selected forms including, but not limited to, greases, oils, and gels. Lubricants may include selected viscosities that permit the lubricants to be dispensed or applied over regular and irregular surfaces, over a wide range of dimensions, or over large and small surface areas. Viscosities are preferably selected between about 0.02 cm$^2$/s to about 20 cm$^2$/s, but are not intended to be limited.

LIS coatings may include selected thicknesses. Thicknesses of the LIS coating stem primarily from the thickness of the underlying hydrophobic coating with its associated microstructure and nanostructure. Lubricants that form the LIS coating do not add substantially to the thickness of the underlying hydrophobic coating. Addition of the Lubricant increases the hydrophobic coating thickness by less than about 1 μm on average.

LIS coatings of the present invention provide one or more selected properties including, but not limited to, contact angles greater than or equal to about 115°; roll-off angles below about 5°; and surface energies below about 20 mJ/m$^2$. The low surface energy of LIS coatings is provided by the stability of the lubricant layer positioned between the hydrophobic coating and liquids and other fouling media that come in contact with the LIS coating.

LIS coatings of the present invention are also self-healing. Low surface energies of lubricants allow the lubricants to spread easily across the surface of the hydrophobic coating when applied. Ability to spread enables lubricants to fill voids if the LIS coating is damaged or scratched. Lubricants residing within porous features of the underlying hydrophobic coating can also be released to the surface, which restores lubricant lost or depleted from the surface due to abrasion, damage, or immersion in liquids or other fouling media over time. The self-healing property restores superhydrophobic and anti-wetting properties of the surface which extends the useful lifetime of the LIS coating. Properties of the LIS coating revert to those of the underlying hydrophobic coating if the quantity of lubricant at the surface is substantially reduced or temporarily depleted from the surface of the LIS coating.

Figure 3B:
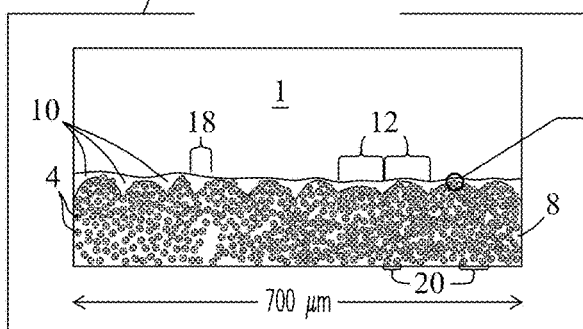

FIG. 3B shows an expanded view of the microstructure of the LIS coating 200. Lubricant 10 fills the microstructure of the hydrophobic coating including interstitial spaces 18 between the surface features 12. In the figure, nanoparticles 6 composed of the second particulate material overlay the porous surface features 12 and yield the texture of the surface features as described previously.

Figure 3C:
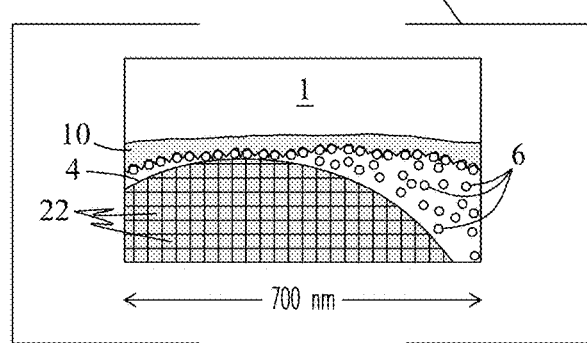

FIG. 3C shows an expanded view of the nanostructure of the LIS coating. In the figure, (first) porous particles 4 in the protruding mounded surface features 12 wick the Lubricant 10 when applied, which infuses internal pores 22 of the porous particles 4, interstitial spaces 18 between the surface features 12, and interstitial spaces 20 between the porous particles 4 that occupy the subsurface in the polymer matrix of the hydrophobic coating. Pores 22 of porous particles 4, and interstitial spaces 20 positioned between the porous particles serve as reservoirs that retain and store the lubricant in the subsurface of the hydrophobic coating. The porous structure of the hydrophobic coating readily infuses with lubricant due to the low surface energy of the lubricant. When filled with lubricant, air pockets positioned around the porous surface features 12 are no longer penetrated by water.

Porosity in the hydrophobic coating may be increased by addition of pore-forming additives to the coating composition described previously. Pore-forming additives increase the pore volume within the polymer matrix of the hydrophobic coating when formed that can then serve as additional lubricant reservoirs when lubricants are applied, delivered, or introduced to the surface of the hydrophobic coating. Lubricant when applied or delivered to the surface of the hydrophobic coating yields the LIS coating.

In some embodiments, porous particles may be infused with lubricant before being introduced into the hydrophobic coating composition prior to being dispensed to a surface or substrate. Lubricant-infused particles may serve as lubricant reservoirs to replenish lubricant when the lubricant is depleted or removed from the LIS coating surface. Lubricants may also be reapplied to the surface of the hydrophobic coating when depleted to restore the hydrophobic and anti-wetting properties of the LIS coating. However, the present invention is not limited to physical reapplication of lubricants. For example, in some embodiments, lubricants depleted or lost from the LIS coating surface may be re-applied from lubricant-infused pores in the underlying hydrophobic coating by dissolving a layer or portion of the polymer matrix, which releases the lubricant and restores LIS properties of the LIS coating. Dissolution of a layer or portion of the polymer matrix may occur as part of a self-polishing mechanism that occurs slowly throughout the life cycle of the coating.

Figure 9A:
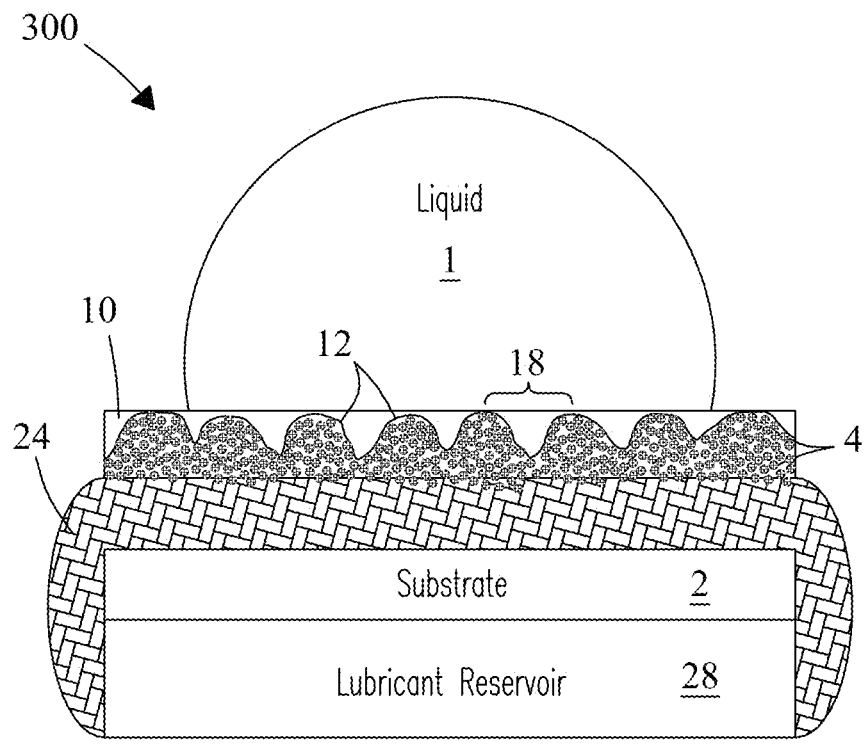
FIGS. 9A-9B illustrate exemplary composite structures incorporating wicking materials according to different embodiments of the present invention.
Figure 9B:
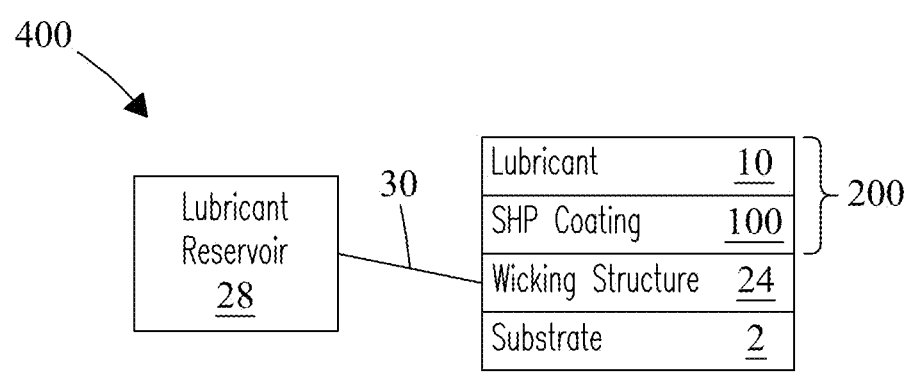

Hydrophobic coatings and LIS coatings of the present invention may be configured with wicking materials that aid retention of lubricants at the surface, as described further in reference to FIGS. 9A-9B.

Hydrophobic coatings and LIS coatings of the present invention can be customized for selected and diverse applications. For example, hydrophobic compositions may be configured to have a higher or lower percentage of hard silica embedded in the soft polymer matrix or to be more porous or less porous as detailed herein. Proportion of silica may be used to control wear, durability, hardness, and stiffness of the resulting coating. Thus, no limitations are intended by description of exemplary structures herein.

Figure 4:
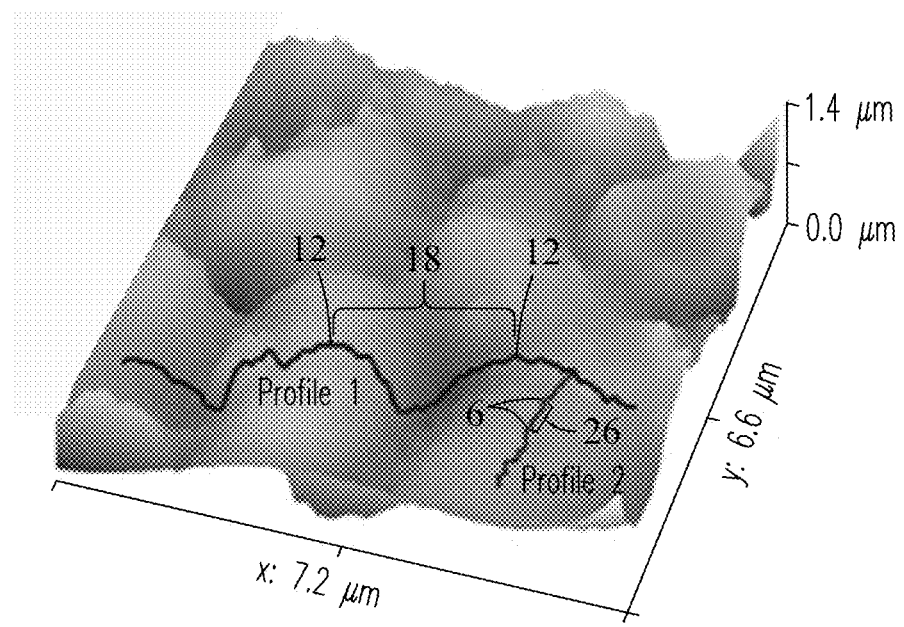
FIG. 4 shows an exemplary surface profile of a hydrophobic coating of the present invention.

FIG. 4 is an atomic force microscopy image showing surface profiles of the exemplary hydrophobic coating of the present invention. The hydrophobic coating includes a hierarchical structure. The first surface profile (profile 1) includes mounded surface features 12 of a micron scale that are composed of the first particulate material (FIG. 2B). In the exemplary embodiment, the first particulate material may be comprised of mesoporous silica particles (e.g., MCM-41®) described previously. Interstitial spaces 18 are shown positioned between the mounded surface features. The second surface profile (profile 2) includes surface features 6 of a nanoscale composed of the second particulate material described previously. In the exemplary embodiment, the second particulate material may be comprised of nanoparticles of fumed silica (e.g., CAB-O-SIL® H-5, Boston, Mass., USA) that overlay the larger mounded features within the hydrophobic coating and give the hydrophobic coating a nanoscale surface texture. The nanoparticles in the hydrophobic coating stabilize the lubricant when applied to the surface of the hydrophobic coating.

Figure 5A:
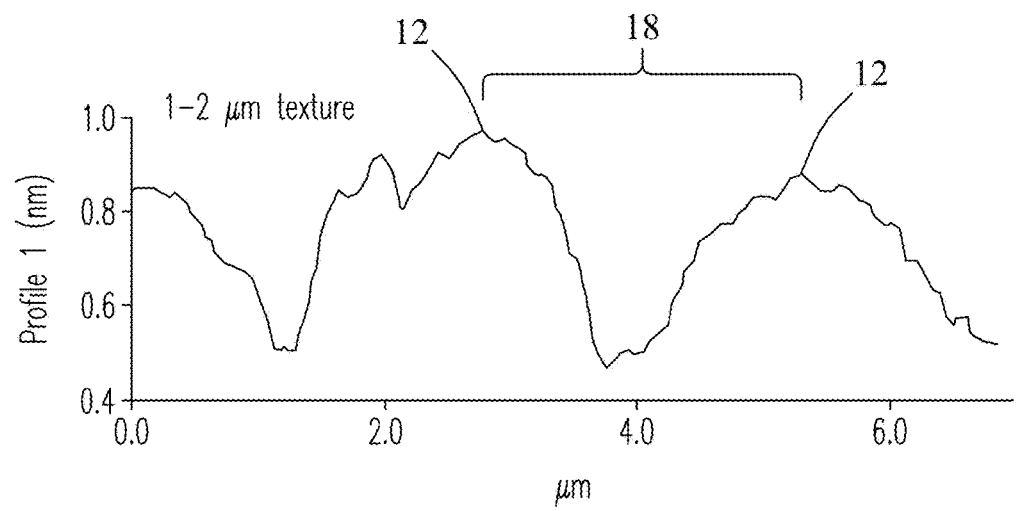
FIGS. 5A-5B show typical dimensions of microscale and nanoscale surface features of the hydrophobic coating of FIG. 4.

FIG. 5A shows exemplary dimensions of the porous (mounded) surface features 12 in the first surface profile described previously in reference to FIG. 4. The mound features include a height and a diameter of about 2 µm. In some embodiments, surface features 12 (mounds) in the hydrophobic coating may have a dimension in both height and diameter between about 1 µm to about 15 µm. However, dimensions are not intended to be limited. Porous surface features deliver desired hydrophobic properties to the hydrophobic coating and serve as reservoirs for retention of lubricants when applied to the surface of the hydrophobic coating.

Figure 5B:
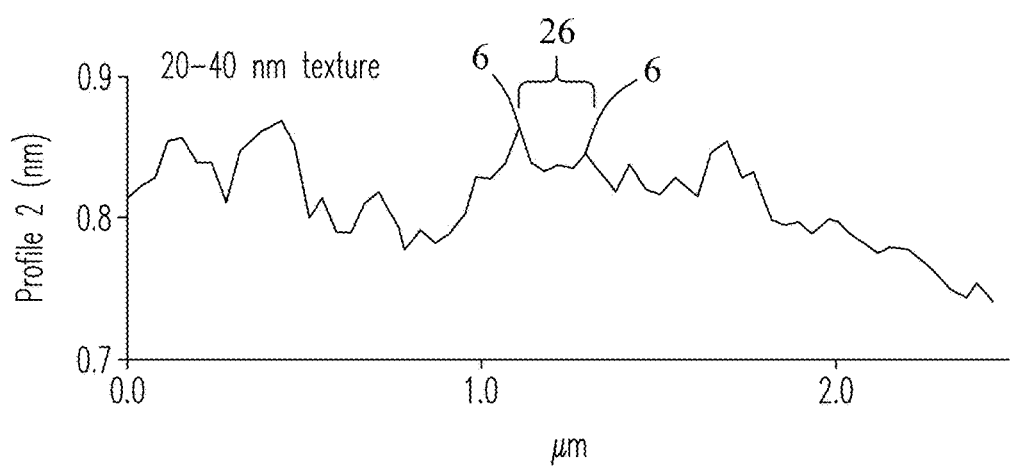

FIG. 5B shows exemplary dimensions of the nano-textured surface features 6 in the second surface profile described previously in reference to FIG. 4. In the exemplary embodiment, the nano-texture may have a dimension in both height and diameter between about 20 nm to about 40 nm that stabilizes lubricants when delivered to the surface of the hydrophobic coating. However, dimensions are not intended to be limited.

Water contact angles are a comparative measure of hydrophobicity of a surface coating. Higher contact angles indicate a more hydrophobic surface which typically exhibits better anti-fouling properties.

Figure 6A:
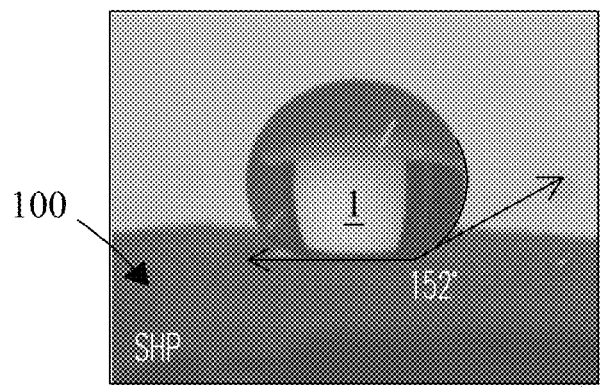
FIGS. 6A-6C present different views of an exemplary hydrophobic surface coating of the present invention.
Figure 6B:
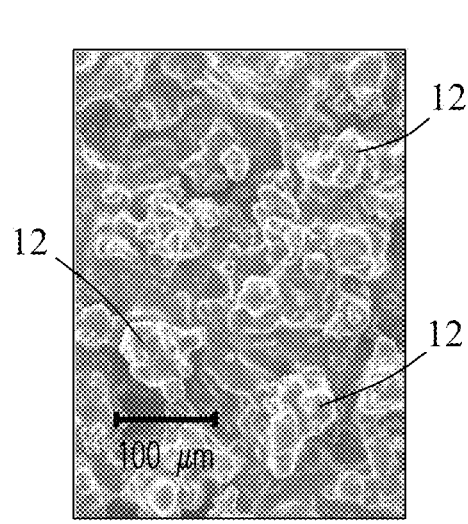
Figure 6C:
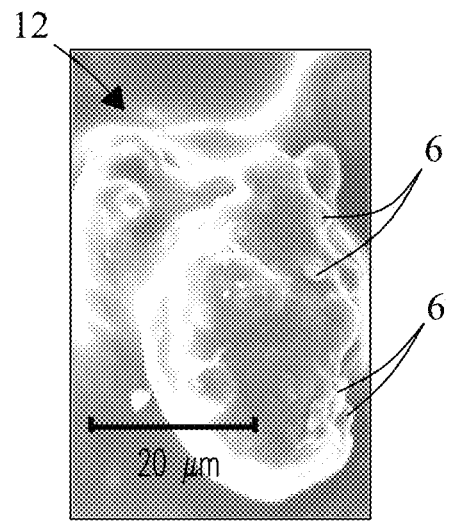

FIG. 6A is a photograph showing a hydrophobic surface coating 100 of the present invention on which a single drop of water 1 is positioned. In the instant embodiment, the coating is a super-hydrophobic coating with a contact angle measured at the surface of 152.4°, which delivers an anti-wetting property. FIG. 6B and FIG. 6C are scanning electron micrographs (SEMs) showing the microstructure of the hydrophobic coating at two resolutions, i.e., 20 µm and 100 µm, respectively. In the figures, the microstructure is characterized by porous (mounded) surface features 12 composed of agglomerates (clusters) of mesoporous particles (e.g., mesoporous silica) (not shown). In various embodiments, the porous (mounded) surface features include a size between about 2 µm and about 100 µm. The porous (mounded) surface features 12 further include small protrusions (~2 µm) 6 that give the hydrophobic coating a nano-textured surface. The nano-textured surface features 6 stem from fumed silica in the hydrophobic coating described previously in reference to FIG. 3B.

Figure 7A:
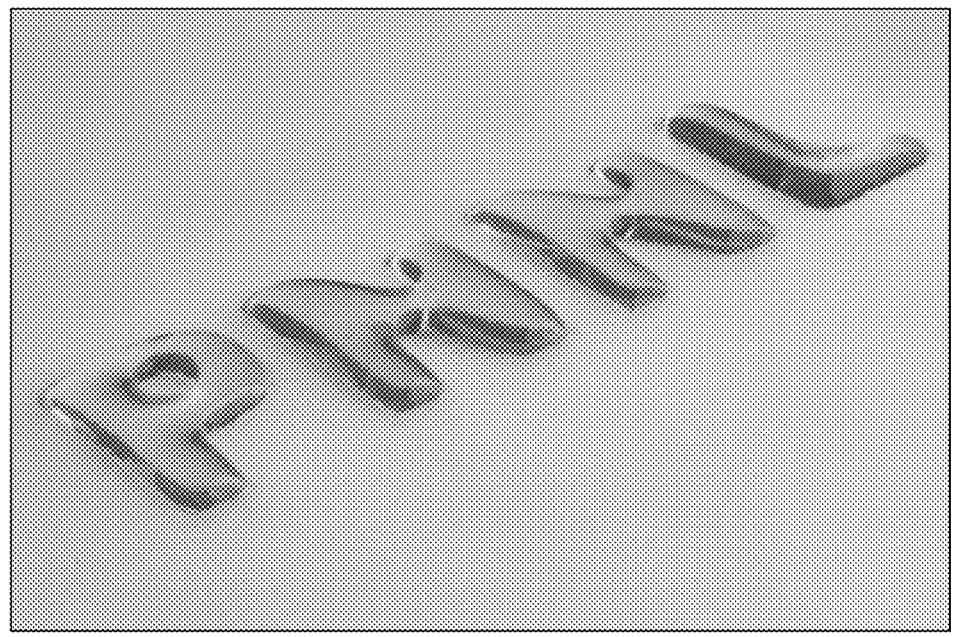
FIGS. 7A-7B are photographs showing positive and negative mask coated surfaces prepared in accordance with the present invention, respectively.
Figure 7B:
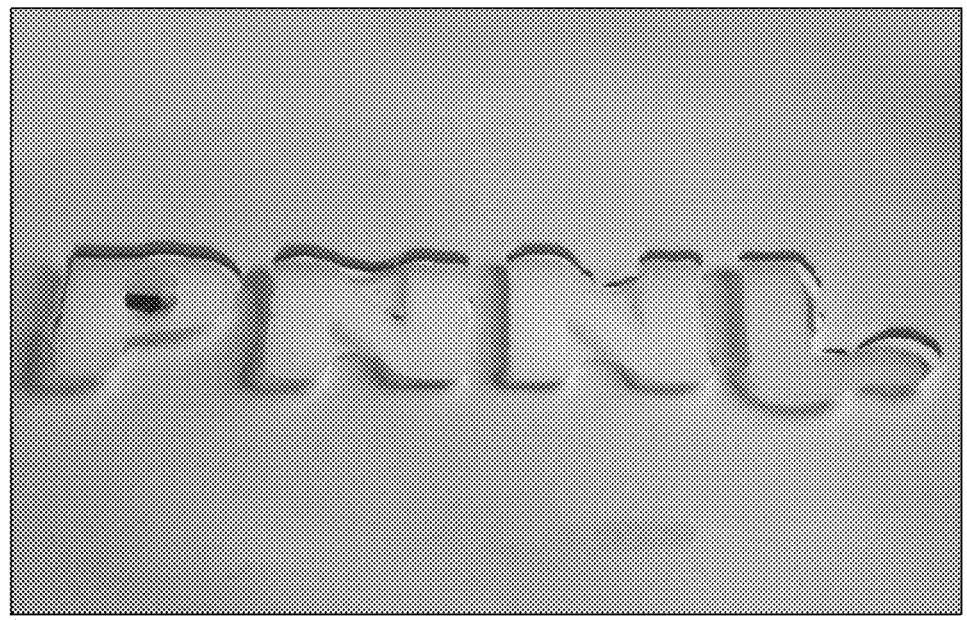

FIG. 7A is a photograph showing a hydrophobic coating painted onto a surface. Letters were stenciled onto the surface from a negative mask and left unpainted (uncoated). Water droplets move to the uncoated surface demonstrating that the hydrophobic coated surface exhibits a strong anti-wetting property. FIG. 7B is another photograph showing a hydrophobic coating in which letters were stenciled onto the surface from a positive mask. Only the letters were painted with the hydrophobic coating. Results show the hydrophobic coating exhibits a strong anti-wetting property.

FIG. 8A is a photograph of an exemplary LIS coating 200 of the present invention. Application of the lubricant (e.g., KRYTOX®) to the hydrophobic coating forms the LIS coating. LIS coatings exhibit a surface energy above that of the underlying hydrophobic coating providing superior anti-fouling properties. In the figure, a single water droplet 1 is shown positioned on the surface of the coating that is at least partially supported by the lubricant (not shown) in the LIS coating. Lubricant is in turn supported by underlying surface features of the hydrophobic coating (not shown). The LIS coating prevents the water droplet from wetting the surface, demonstrating the anti-wetting property of the coating. In the figure, contact angle measured at the surface of the LIS coating is 115 degrees (114.5 degrees), slightly lower than that observed for the hydrophobic coating described previously (FIG. 6A). Results are attributed to partial filling by the lubricant of the underlying surface texture of the hydrophobic coating. Typical water contact angles for LIS coatings are between about 110 degrees to about 120 degrees on average.

FIG. 8B and FIG. 8C are optical micrographs showing the surface texture of LIS coating at two resolutions, i.e., 20 µm and 100 µm, respectively. Nanoparticles 6 (described previously in reference to FIG. 2C) are shown embedded in the polymer matrix of the underlying hydrophobic coating positioned atop porous surface features (not shown), and infused with the Lubricant 10.

LIS coatings of the present invention resist wetting by various liquids. Anti-fouling properties are due in part to low surface energy and low surface friction values of these coatings. LIS coatings have surface energies close to those of the applied lubricants (e.g., KRYTOX®) and slightly higher than the underlying hydrophobic coating. The low surface energies permit the lubricant to completely cover the underlying hydrophobic coated substrate. LIS coatings also have a surface energy significantly lower than the surface tension of water (72 mJ/m$^2$) such that water and water-containing liquids readily release from the LIS coating or form liquid droplets if not removed from the sample surface. In some embodiments, LIS coatings of the present invention may include a surface energy value (e.g., 12.5 mJ/m$^2$) lower than the matrix polymer (e.g., PDMS) in the underlying hydrophobic coating (e.g., 15 mJ/m$^2$). In some embodiments, LIS coatings include a surface energy below about 20 mJ/m$^2$. In some embodiments, LIS coatings include a surface energy between about 15 mJ/m$^2$ and about 20 mJ/m$^2$. In some embodiments, LIS coatings include a surface energy between about 12 mJ/m$^2$ and 22 mJ/m$^2$. LIS coatings easily shed liquids with low tilt angles or roll-off angles of less than about 10 degrees or light agitation which is lower than that observed for the hydrophobic coating. In some embodiments, roll-off angle may be less than about 5 degrees. LIS coatings readily repel water despite a small drop in hydrophobicity compared to the hydrophobic coating. LIS coatings also resist fouling by reducing the surface area available for attachment of the fouling material or liquid in concert with the lubricant spread over the surface of the LIS coating. TABLE 1 compares properties of hydrophobic coatings and LIS coatings of the present invention against various conventional coatings known in the art.

TABLE 1

| Material | Water contact angle (degrees) | Surface energy (mJ/m$^2$) | Roll-off angle (degrees) |
|---|---|---|---|
| Present Invention | | | |
| PDMS[#] | 112 | 14.8 | 75 |
| PDMS + Porous Silica Particles[#] | 130 | 13.6 | 25 |
| SHP Coating[#] (PDMS + Porous particles + Fine Particles) | 151 | 3.1 | 8.0 |
| LIS Coating[#] (PDMS + Porous particles + Fine Particles + Lubricant) | 114 | 13.8 | 4.6 |
| Reference Materials | | | |
| Fiberglass | 48 | 51.7 | >90 |
| Steel | 39 | 50.5 | 29 |
| Glass | 51 | 48.6 | 34 |
| Copper | 40 | 41 | 30 |
| Plastics | 70-100 | 30-40 | >90 |
| TEFLON ® | 97 | 24.1 | 15 |
| INTERSLEEK ® Anti-Fouling paint | 68 | 34.5 | 25 |
| Pitcher plant Natural LIS surface | 71 | 38 | N/A |
| Lotus Leaf Natural SHP surface | 163 | 0.6 | 9.0 |

[#]Values are averages from five samples. PDMS and silica are exemplary materials and not meant to be constraining.

The hierarchical microstructure and nanostructure (nanotexture) of the surface coatings are water repellent and provide antifouling properties. Data show that incorporating nanoporous silica (first particulate material) with PDMS in the hydrophobic coating increases the water contact angle. Nanotexture at the surface of the coating stemming from the addition of fine silica (second particulate material) decreases the surface area of the coating in contact with liquids, which decreases the surface energy of the resulting coating. Hydrophobic coating compositions and coatings of the present invention are inexpensive and are formed of non-toxic components that can be easily deposited on a wide range of surfaces and materials. Data further show that infusion of the hydrophobic coating with lubricant yields a LIS coating with a lower contact angle and a higher surface energy than the underlying hydrophobic coating. The lubricant can surround microstructures at the surface of the coating that reduces surface roughness or texture. However, while contact angle and surface energy may be reduced, droplet mobility is not reduced. Roll-off angle for the LIS coating is lower than for other tested materials, which renders the LIS coating highly water repellant.

Hydrophobic coatings of the present invention also include a composition and structure that support and retain lubricants when applied that provide a separate functional modality as lubricant infused surfaces (LIS) coatings. LIS coatings of the present invention are self-healing and thus robust. The low surface energy of LIS coatings permits lubricants to flow into damaged or abraded areas on the surface extending the useful lifetime. Hydrophobic coatings and LIS coatings may be separately applied or delivered in a single step. And, unlike conventional advanced materials, both the hydrophobic coating composition and lubricants are scalable permitting easy application to small, large, uneven, or irregular surfaces and substrates such as those of ship hulls. For example, low friction hydrophobic coatings and LIS coatings of the present invention when applied to ships and other cargo-bearing vessels operating in water environments may demonstrate improved fuel efficiency due to a reduced drag and a reduced accumulation of fouling organisms (e.g., bacteria, diatoms, algae, barnacles, and like organisms) coatings. All applications as will be envisioned by those of skill in the art in view of the disclosure are within the scope of the present invention.

Hydrophobic coatings and LIS coatings also have extended lifetimes owing to the porous structure of the hydrophobic coating that aids retention of the lubricant. In addition, hydrophobic coatings and LIS coatings of the present invention may be used independently or may be combined to provide enhanced and advantageous properties. The hydrophobic coating and lubricants work synergistically and independently. For example, when combined, hydrophobic coatings and LIS coatings of the present invention synergistically combine hydrophobic and LIS properties. For example, particulate materials in the hydrophobic coating maximize storage and delivery of lubricants to the surface. And, retention of lubricants by the hydrophobic coating does not hinder performance of the lubricants. Further, nanotextured features arising from the smaller particles in the underlying hydrophobic coating serve to support and retain lubricants when applied or delivered to the hydrophobic coating. LIS coatings of the present invention also include anti-fouling properties suitable for use in fouling environments and applications such as, for example, ship coatings and antibacterial surfaces for medical, biological, and other industrial applications. The underlying hydrophobic coating can also repel water and other fouling substances independently should the lubricant be removed. And, lubricants may be easily reapplied or replaced as described herein to restore anti-fouling and low-friction properties. In addition, hydrophobic coatings and LIS coatings of the present invention provide higher contact angles and lower surface energy values on average than conventional non-stick materials such as TEFLON®. Coatings of the present invention also provide advantageous structural features. For example, the coatings are flexible and have enhanced strength. The hydrophobic composition includes inorganic components that also reduce costs of preparing the compositions. Coating compositions are also adjustable, meaning components may be modified to include various materials that allow properties to be tailored. Coating compositions may also be applied in a single application step.

Composite (Wicking) Structures

The present invention includes composite structures that include various wicking materials as components of the composite structure. Retention of lubricant in a lubricant-infused surface (LIS) coating may not be permanent when LIS coated surfaces are exposed to high flows of liquids for extended periods of time. Desirable and advantageous LIS properties of LIS coatings may be lost if lubricant is removed from the surface. Functional lifetimes of LIS coatings can be extended in concert with an embedded reservoir that retains lubricant within the LIS coating. Extending the available volume of the lubricant reservoir that allows the reservoir to automatically and continuously replenish lost lubricant on demand can significantly improve the performance of the coating in various applications. Using a lubricant wicking structure to replenish the lubricant in the LIS coating enables a much longer operational lifetime. FIG. 9A illustrates an exemplary composite LIS coated surface system (structure) 300 according to one embodiment of the present invention. The composite structure includes a selected wicking structure 24 or material in contact with substrate 2 with a LIS coating 200 positioned on the surface of the wicking material. Wicking structure 24 is in fluid contact with an integrated lubricant-filled reservoir 28, container, or device that supplies a lubricant 10 through the wicking structure 24 to the surface of the LIS coating. Wicking structure 24 continuously infuses the surface of the LIS coating 200 with lubricant 10 that replenishes the lubricant.

Wicking materials suitable for use include, but are not limited to, textured materials, fibrous materials, and porous materials such as, textiles, fabrics, fiberglass, weaves of these various materials, porous membranes, self-polishing co-polymers, porous textured substrates, and other fibrous and porous materials that form fibrous or porous networks within the wicking materials. In some embodiments, the wicking structure 24 may serve as its own support rendering the substrate 2 unnecessary. No limitations are intended.

Lubricants delivered to the surface may fill interstitial spaces 18 positioned between porous (mounded) surface features 12 with their aggregates of porous (first) particles 4. Lubricants may further fill smaller interstitial spaces 26 positioned between nanoporous (second) particles 6 which overlay porous surface features 12 of the composite structure. Smaller interstitial spaces 26 may include a size of between about 5 nm to about 50 nm. Nanoporous particles 6 form the surface texture at the surface of the composite structure. Wicking materials or structures in the composite structure stabilize Lubricants at the surface of the LIS coating so that they are not easily leached or removed. Wicking materials and structures also serve to replenish lubricants when depleted, which regenerates surface properties of the LIS coating.

FIG. 9B illustrates another exemplary composite LIS coated surface system (structure) 400 of the present invention. The composite structure includes a wicking structure 24 or material in contact with a substrate 2 or other support. In the figure, a hydrophobic coating 100 is positioned on the surface of the wicking structure 24. A lubricant 10 when applied to the surface of the hydrophobic coating 100 forms the LIS coating 200 on the surface of the composite structure. In the instant embodiment, lubricant 10 may be delivered to the surface of the LIS coating from an external lubricant reservoir 28 that couples to the wicking structure 24, for example, via a fluid delivery device 30 such as a capillary. The fluid delivery device supplies lubricant to the wicking structure that continuously replenishes lubricant to the surface of the LIS coating. All composite structures as will be envisioned by those of skill in the art in view of the disclosure are incorporated herein.

Applications

Hydrophobic coatings and LIS coatings of the present invention find use in various industrial and commercial applications including, e.g., aerospace, automotive applications, optics, healthcare applications, de-icing applications (e.g., on aircraft), anti-fogging, self-cleaning, anti-wetting, anti-corrosion applications (e.g., anti-corrosion products), anti-fouling applications (e.g., anti-fouling paints), anti-microbial applications, drag reduction applications, low friction applications, non-stick coatings, and like uses and applications.

EXAMPLES

The following examples provide a further understanding of various aspects of the present invention.

Example 1

Sprayable Hydrophobic Coating

An exemplary hydrophobic coating composition was prepared. The composition included: mesoporous silica (MCM-41, Sigma Aldrich, USA), fumed silica (e.g., CAB-O-SIL® H-5, Cabot Corp., Boston, Mass., USA), polydimethylsiloxane (PDMS) polymer (e.g., Sylgard 184, Dow Corning, USA) mixed in hexane solvent (Sigma-Aldrich, USA). Mesoporous silica particles were ball milled to a diameter ranging from about 1 µm to about 3 µm, rinsed with isopropanol, and dried. CAB-O-SIL® H-5 particles were of a size between about 20 nm to about 30 nm that form chain-like aggregates with an approximate length of 100 nm to 300 nm. Hexane lowers viscosity of the composition and delays polymerization of the PDMS until the hydrophobic coating composition is applied to the receiving surface.

In an exemplary composition, 0.3 g mesoporous silica (first particulate material), 0.6 g fumed silica (second particulate material), 1.6 g PDMS (matrix polymer), and 25 g of hexane (dispensing solvent) were mixed. Mixed components were sonicated for about 30 minutes to thoroughly mix. The batch was sufficient to coat 10 square sample coupons (3-inches by 3-inches). The coating composition is scalable for coating larger surfaces. Curing of the hydrophobic coating composition after application or delivery to a surface forms the hydrophobic coating on the surface or substrate. In some embodiments, curing at room temperature may take between about 24 hours to about 48 hours. In some embodiments, curing at temperatures up to about 100° C. may take about 3 hours. Other hydrophobic coatings containing other material compositions may be formed with the process.

Example 2

Formation of LIS Coatings by Application of Lubricants

Various lubricants were applied to hydrophobic coatings of EXAMPLE 1 and to other hydrophobic coatings of similar composition to form LIS coatings. Viscosity of the lubricants was modified as needed to allow spraying, painting, or air-brushing of the lubricants. In some applications, lubricants were mixed with suitable or volatile organic solvents such as isopropanol or perfluorohexane solvent in a 1:10 weight ratio to provide a selected or preferred viscosity for application. In some applications, lubricant viscosities were also selected by heating the lubricant, for example, to temperatures between about 60° C. to about 70° C. prior to application. Lubricant was dispensed to the textured surface of the hydrophobic coating and allowed to infuse (permeate) the hydrophobic coating. The coating became more transparent following infusion with lubricant. Infusion of the hydrophobic coated surface was achieved in a typical time between about 1 minute to about 60 minutes depending on the size of the area being coated and the viscosity of the lubricant.

In one exemplary application, lubricant was applied by spraying the lubricant.

In another exemplary application, lubricant was applied to the surface of the hydrophobic coating by air-brushing. The air-brushing mixture may be prepared by mixing the lubricant with perfluorohexane solvent in a 1:10 weight ratio prior to delivery.

In another exemplary application, lubricant viscosity was not modified and lubricant was applied to the surface of the hydrophobic coating by brush coating the coated substrate or surface.

In another exemplary application, infusion of the hydrophobic coating by the lubricant was enhanced and accelerated by applying alcohol (e.g., isopropyl alcohol) to wet the surface of the hydrophobic coating and to fill the surface porosity of the hydrophobic coating to enhance infusion of the lubricant. Lubricant had a lower surface energy than the alcohol so readily displaced the alcohol, which infused the porous structure of the hydrophobic coated surface. Pre-infusion with alcohol or another wetting liquid is not a necessary condition for successful infusion of lubricants. No limitations are intended. Modification of lubricant viscosities may be performed in numerous ways as will be understood by those of ordinary skill in the art.

In some applications, excess lubricant was removed from the porous surface of the hydrophobic coating following infusion using gravitational forces, weak centripetal forces, or forced air. For example, excess lubricant may be removed by simple gravitational forces within a period of 24 hours or less following application without any overt action being required to remove the lubricant. Infusion of the hydrophobic coated surface was achieved in a time typically between about 1 minute to about 60 minutes depending on the size of the area being coated and the viscosity of the lubricant. The frosted appearance of the hydrophobic coating following infusion with lubricant became more transparent depending on the size of the mesoporous particles used in the hydrophobic coating.

Properties of LIS coatings listed in TABLE 1 demonstrate that the coatings exhibit relatively high contact angles, low surface energies, and low roll-off angles making them highly water repellant compared to other conventional surface coatings. Surface energies are still low and better than TEFLON®. LIS coatings by comparison are also more hydrophobic than many conventional low-friction polymers including, e.g., PDMS and TEFLON® and antifouling paints such as INTERSLEEK® (AkzoNobel Marine Coatings, Amsterdam, Netherlands).

Example 3

Figure 10A:
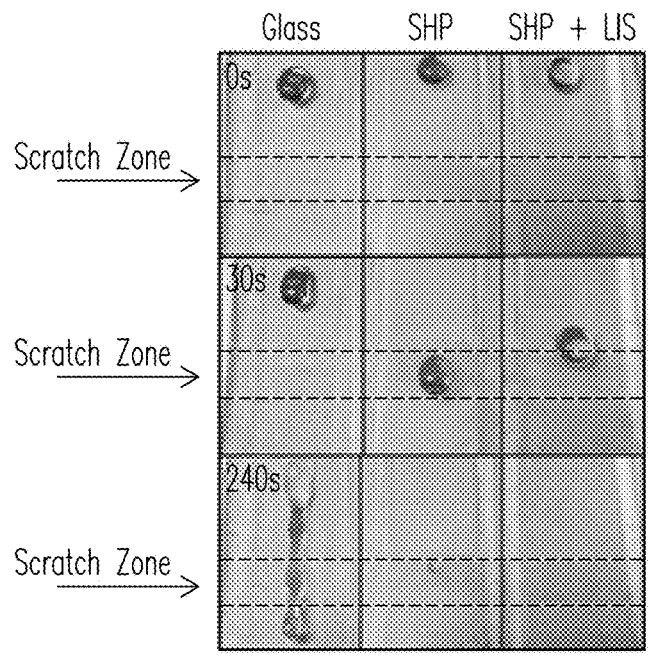
FIGS. 10A-10B show anti-fouling properties of an exemplary SHP coating and LIS coating of the present invention in contact with two selected sticky materials.
Figure 10B:
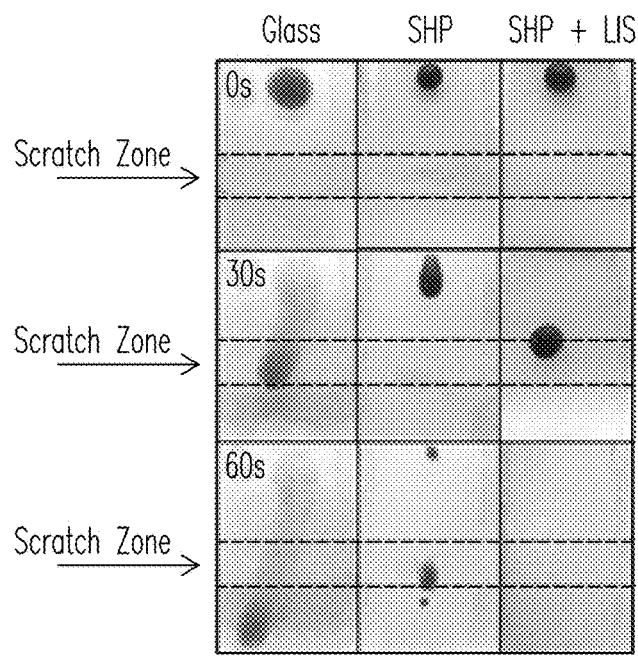

Anti-Fouling and Self-Healing Tests of SHP- and LIS-Coated Surfaces with Selected Liquids Hydrophobic (e.g., SHP) and LIS coated surfaces were subjected to multiple adhesive and fouling materials and media including, for example, honey, biomedical bacteria (*Pseudomonas putida*), marine seawater (EXAMPLE 5), and other fouling media. Drops of honey and a stained biomedical bacteria solution were placed in individual tests near the top edge of uncoated (column 1), SHP-coated (column 2), and LIS-coated (column 3) glass slides. Slides were inclined at an angle of ~75 degrees for honey and 15 degrees for bacteria to observe motion of the liquids over each surface. SHP and LIS coated samples each had an uncoated zone and a zone deliberately scratched with a razor blade to assess the self-healing properties of the LIS coating. FIG. 10A shows that honey adhered to and moved slowly over the uncoated glass slide, which had the highest surface energy. In the second column, honey moved rapidly over the low energy SHP coating. However, honey residue remained where the coating was scratched. The last column shows the LIS coating. Honey moved more slowly over this coating than on the SHP, but did not adhere (pin) to the substrate, even where the coating was scratched. After 240 seconds, no honey residue remained on the LIS-coated glass surface. FIG. 10B shows that when a drop of stained bacterial suspension was placed on the uncoated glass slide, the bacteria adhered predictably to the surface and spread over the surface leaving a fouling trail. On the SHP-coated surface, the bacterial suspension initially adhered to the surface and did not descend. When the drop unpinned, it moved quickly over the surface. A small amount of bacterial residue remained where the coating was scratched. On the LIS-coated surface, the bacterial slurry moved steadily and unimpeded, even over the scratch-damaged section showing that the infused lubricant provided self-healing capacity to the scratched section. The low-energy lubricant spreads over the damaged area, filling in the scratches, and preserves continuity of the fluid layer, which prevents honey from sticking to any part of the exposed substrate After 60 seconds, no visible residue remained on the LIS coated surface. In this example, coatings of the present invention prevented adhesion of an exemplary sticky substance (honey) as well as biomedically-relevant bacteria. The LIS coating provided self-healing and robustness when minor damage was introduced to the coating. Results show the SHP coating was affected more by the scratch damage so may be best suited for environments where water resistance is desirable but abrasive wear is less prominent such as, for example, satellite dishes, and structural coatings. The LIS coating maintains performance when damaged. Results indicate that LIS coatings may be used in selected environments where SHP coatings are not sufficient or suitable.

Example 4

Anti-Fouling Tests of SHP and LIS Coated Surfaces with Dried Bacteria

In hospitals, high-risk infectious material can be difficult to remove, especially if dried on surfaces. An informal tape test was performed with drops of a biomedical bacterial culture (*Pseudomonas putida*). ~75 µL of the bacterial culture was placed on a SHP coating and a LIS coating and allowed to dry for 24 hours. Adhesive tape was smoothed over the surface of the fouled spot on each coating surface and peeled back. Fouling spots were photographed before and after tape was applied. Images were converted into 3-D profiles using color intensity as a measure of the quantity of remaining residues. The SHP coating retained approximately 30% of the color intensity of the original biofouling spot. No color was observed for the LIS coating indicating the coating did not retain residues after the tape test of the original biofouling spot. Results show hydrophobic coatings and LIS coatings of the present invention are self-cleaning and configured to minimize fouling by liquid foulants. Properties of these coatings determine how easily or completely fouling can be removed. LIS coatings have a liquid interface so dried foulants and residues do not adhere strongly to the LIS surface and may be easily removed. Results indicate that LIS coatings of the present invention may find application in hospitals and other industrial environments where fouling is likely but where regular cleaning can mitigate risks of infection or other deleterious effects.

Example 5

Anti-Fouling Tests of SHP and LIS Coated Surfaces Under Marine Flow

Anti-fouling properties of exemplary hydrophobic and LIS coated surfaces of the present invention were tested by exposing coated surfaces to filtered and natural seawater (Sequim Bay, Wash.). In a first test, filtered seawater was pumped through a sample chamber containing LIS coated slides to determine if the coatings were stable and effective under flow conditions. Mass of the underlying hydrophobic coated samples were measured before infusion with the lubricant, before exposure to the seawater (2.3 m/s for 60 hours), and after exposure to the seawater to determine the mass of lubricant retained by the coating. LIS coated surfaces retained lubricant and LIS functionality for the duration of the test. Surface energy, hydrophobicity, and roll off angles were unchanged after the flow tests (similar to values given in TABLE 1), demonstrating the effectiveness and durability of the LIS coatings under flow conditions. As will be appreciated by those of ordinary skill in the art, performance can change as a function of the coating composition and flow rates. However, in general, results demonstrate that painted LIS coatings retain functionality under flow conditions and relatively high flow rates (8.3 km/hr).

In a second test, 3-inch×3-inch FR4 fiberglass coupons were coated with SHP and LIS coatings and placed in a tank that circulated a flow of natural seawater for a period of 6 weeks. The experiment continued until fouling was observed on both the SHP and LIS coated samples. Fouling on both the hydrophobic and LIS coated samples was assessed qualitatively against uncoated coupons and other standard materials. Results showed that SHP coated samples resisted fouling as long as the surfaces retained their water repellent properties, approximately 3 days at these test conditions. LIS coated surfaces that retained lubricant showed no signs of fouling and continued to be hydrophobic. LIS coated coupons showed no marine fouling for over a month, which was approximately 10 times longer than the SHP coating and longer than other reference materials listed in TABLE 1 including fiberglass, PDMS, steel, and TEFLON®. These reference materials fouled in from 1 day to 10 days.

In a third test, 3-inch×3-inch FR4 fiberglass coupons were coated with SHP and LIS coatings and placed in tank containing natural seawater with no circulating flow. Results showed that SHP coated samples resisted fouling as long as the samples retained their water repellent properties (~1 to 3 weeks on average). LIS coated coupons resisted marine fouling much longer than other conventional materials including fiberglass, glass, TEFLON®, Polyether ether ketone (PEEK), poly-vinyl chloride (PVC), steel, and marine antifouling paints. Under static and low-flow conditions, while fouling did occur on LIS-coated surfaces over time, results showed that the fouling was not strongly attached and was easily removed with gentle agitation or under an increased water flow rate. Results indicate that SHP coatings and LIS coatings resist fouling in both static and flow conditions in marine environments. While the coatings can foul over time, the coatings readily release the fouling materials.

Example 6

Lubricant Wicking into Coating and Replenishment of Lubricant

Figure 11:
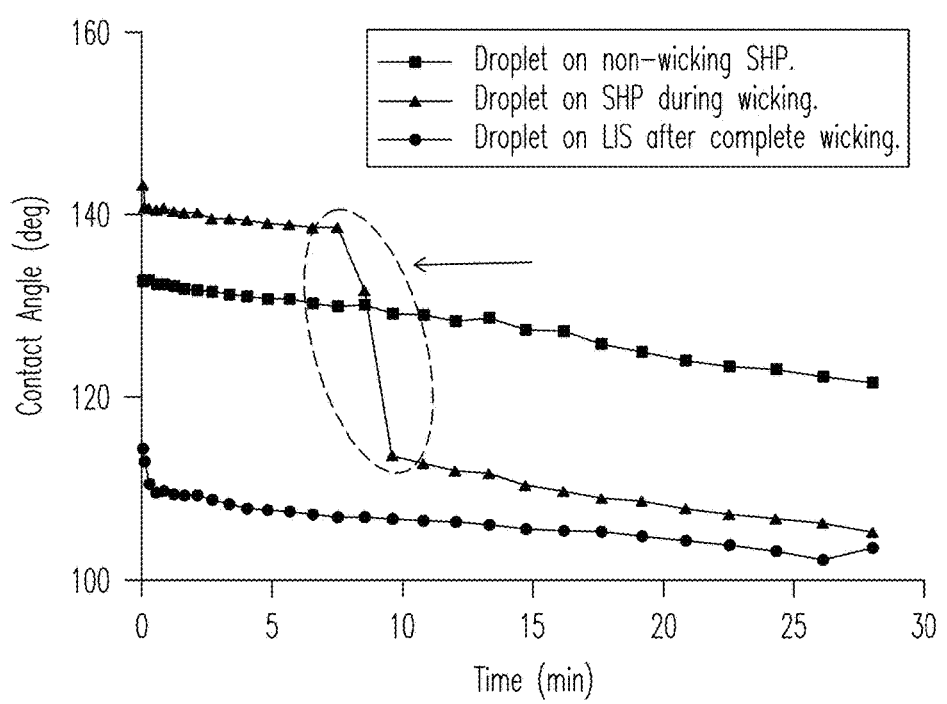
FIG. 11 plots the change in contact angle of a hydrophobic coating as a function of time when contacted by a lubricant delivered through a wicking structure and the change in contact angle of the LIS coating formed by the wicking lubricant.

A lubricant wicking structure and reservoir were formed from a fiberglass weave (~2-inch×2-inch) that was laid over glass microscope slides to achieve a flat surface. The surface was coated by painting with a mixture containing MCM-41® and CAB-O-SIL® H-5 mixed together in PDMS polymer. Samples were cured for ~24 hours to form the SHP coating on the surface of the fiberglass weave. SHP-coated samples remained flexible. In a first experiment, the slide was placed in an elevated position in a petri dish held in place ~3-4 mm from the bottom of the dish. The petri dish was placed onto the stage of a goniometer and leveled. A drop (15 µL) of water was placed on the surface of the SHP-coated fiberglass weave. Contact angle of the water droplet on the surface was measured for approximately 30 minutes and removed. FIG. 11 shows the change in contact angle of the SHP-coated surface that includes the wicking structure as a function of time. Contact angle begins above 130 degrees and slowly and steadily declines. The gradual decline in contact angle over time is attributed to evaporation of the water droplet. Edges of the droplet were pinned in place while the volume of the droplet slowly lowered resulting in the decrease in contact angle.

In a second experiment, a water droplet was placed on the surface of the SHP-coated sample and contact angle was measured as a function of time. A low energy lubricant (KRYTOX® liquid) was then added to a petri dish at the base of the SHP-coated fiberglass weave so as to be in contact with the edges of the fiberglass weave. Lubricant was not applied directly to the surface of the SHP-coated weave. During a 30 minute period, lubricant wicked unaided from the base of the fiberglass weave through the weave into the SHP coated surface positioned at the top of the fiberglass weave. FIG. 11 shows results of the wicking by the SHP coating fiberglass weave in fluid contact with the reservoir of liquid lubricant. As shown in the figure, a transition and drop in contact angle is observed at about 8.5 minutes of elapsed time. When the lubricant reached the water droplet positioned at the surface of the SHP-coated weave, contact angle suddenly dropped (~10 seconds) from ~140 degrees (i.e., the SHP coated surface) to a ~115 degrees, characteristic of a LIS coated surface. Contact angles monitored during the wicking process show the SHP coating clearly and rapidly transitions from having SHP properties to having LIS properties. Results show that the SHP-coated surface does not need to be coated with lubricant directly in order to form the LIS coating or to achieve the desired LIS properties. The SHP coating need only be maintained in liquid contact with an internal or external reservoir of lubricant for a sufficient time to allow wicking through the wicking structure to the SHP-coated surface.

In third experiment, a water droplet was placed on the fully infused LIS coated sample. Contact angle was again observed for 30 minutes. FIG. 11 shows that the contact angle of the LIS coating begins at near 115 degrees and declines gradually over time due to partial evaporation of water from the droplet with a corresponding gradual relaxation in contact angle over time.

In a fourth experiment, canvas cloth (a representative flexible fibrous material) was spray-coated with an SHP coating. One edge of the coated cloth was placed in contact with a reservoir containing KRYTOX® lubricant. Lubricant wicked unaided through the cloth fully infusing the SHP coating with lubricant forming the LIS coating. Results show the flexible material transforms from the native non-coated state, to a hydrophobic-coated (e.g., SHP coated state) state after spray coating with the hydrophobic composition, and then to a full LIS-coated state after wicking of the lubricant into the hydrophobic-coated material detailed here. Results further demonstrate that LIS coatings of the present invention are self-healing when lubricant is supplied from an external reservoir. The reservoir effectively delivers and maintains the lubricant at the surface of the coating indefinitely. Delivery of lubricant is limited only by the size of the external reservoir. Tests show that lubrication of LIS coatings can be applied indirectly and maintained for extended periods. LIS coatings of the present invention can also be dispensed through irregular porous and textured surfaces (e.g., cloth, fabric) by spray coating. Wicking properties of underlying structures or material layers can be combined advantageously to deliver and maintain lubrication of the coated surface.

Example 7

Figure 12A:
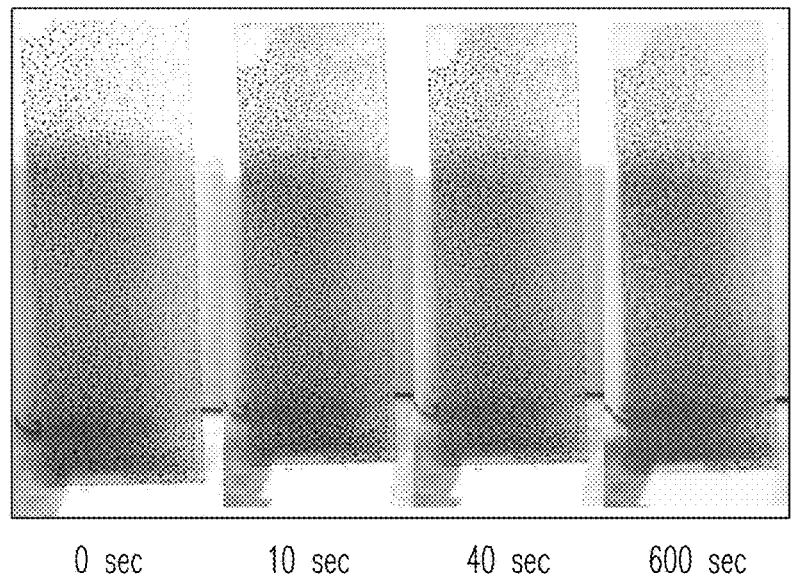
FIGS. 12A-12B show the progression of paint droplets of an exemplary SHP coating and LIS coating of the present invention as a function of time, respectively.
Figure 12B:
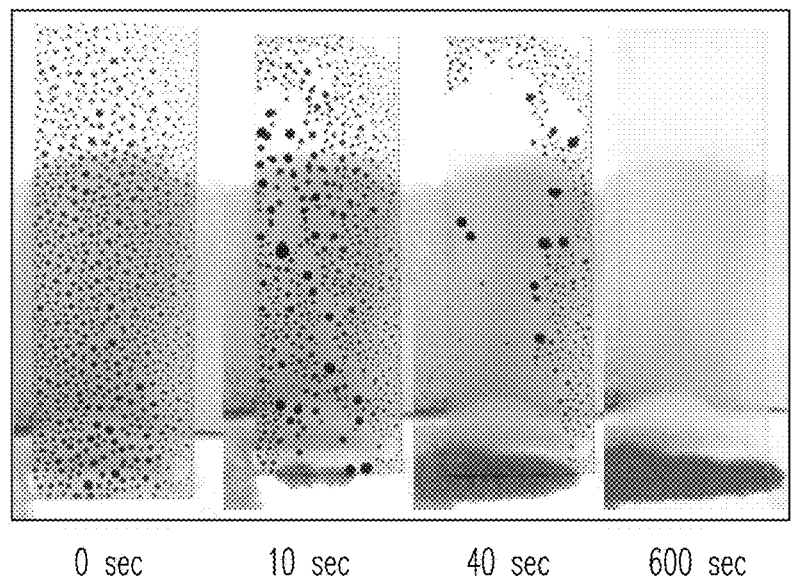

SHP-Coated and LIS-Coated Surfaces Resistance to Wetting by Aerosols and Microdroplets Wetting properties of hydrophobic and LIS surfaces of the present invention were tested. Surfaces in general may be fully, partially, or intermittently wetted by submersion in liquids, by exposure to humid environments, or by contact with liquid droplets via splashing, rain, mists, sprays, and aerosols. In one experiment, glass slides [2 inches (5.1 cm) by 1 inch (2.5 cm) coated with an SHP coating, and a LIS coating were laid horizontally and sprayed with a water-based paint using a commercial airbrush delivered as a fine mist or aerosol. On uncoated glass slides, paint droplets spread out and fully wet the surface forming an even coat of paint. On the SHP surface, paint droplets landed on the surface but did not wet the surface; droplets remained individually separated. On the LIS surface, individual and finely separated paint droplets formed initially on the horizontal surface, but remained mobile and aggregated with nearby droplets forming fewer and larger droplets. FIG. 12A shows the progression or movement of paint droplets on the SHP coated surface as a function of time (0 seconds to 600 seconds). Fine microdroplets (~1 µL) remained immobilized on the SHP coating. Droplets were stable for over 600 seconds. FIG. 12B shows progression or movement of paint droplets on the LIS coated surface as a function of time (0 seconds to 600 seconds). When slides were tilted to a near vertical position, microdroplets combined forming larger droplets (~1 µL to 5 µL) that moved quickly down the surface and were readily released from the surface of the LIS coating over time. Even the smallest microdroplets were mobile. After 600 seconds, the LIS coated surface was free of paint microdroplets. Results show LIS coatings are superior in high humidity environments or in environments where liquid microdroplets may interfere with the function of the surface or where liquid microdroplets may have other deleterious effects including fouling and corrosion. Outdoor surfaces that suffer negative effects from rain or humidity can also benefit from the anti-wetting properties of the LIS coating. LIS coatings also have numerous applications in medical applications where ability to shed droplets of biological fluids may be efficacious or improve safety.

Example 8

LIS Coatings with Enhanced LIS Properties

Enhancing Porosity with Pore Forming Additives

LIS coatings with enhanced LIS properties were prepared. Different pore-formers were added to the base coating composition (e.g., silica in PDMS described in EXAMPLE 1) to increase porosity in the base coating. The LIS coating was prepared as in EXAMPLE 2. In various tests, sugar was added as the pore former. Particle sizes are not limited. Increase in porosity in the coating was a function of the amount of sugar added. In one exemplary test, 0.9 g of powdered sugar (~70 µm to 250 µm) was added to a hydrophobic coating composition containing 6 g PDMS, 0.3 g mesoporous silica particles and 0.6 g CAB-O-SIL® H-5 particles. Porosity in the coating increased 32%. In other tests, salt (NaCl) was added as the pore former. Particle sizes are not limited. Similar results were achieved. In other tests, solid particles of other materials such as starches can be dissolved from the cured coating to enhance the porosity of the polymer matrix. In other tests, porosity of a base coating comprising, for example, ceramic particles in a matrix polymer was enhanced with a surfactant such as sodium dodecyl sulfate (SDS). The base coating composition (EXAMPLE 1) was mixed 1:1 with a solution of water containing selected concentrations of SDS (e.g., 1% SDS). Porosity within the matrix PDMS polymer of the resulting coating was enhanced by 12%. Increasing or decreasing the ratio of water/SDS solution to PDMS in the composite mixture changes the porosity within the matrix polymer of the coating. For example, when the base coating composition (EXAMPLE 1) was mixed 10:1 with a solution of water and SDS (1% in water by weight), porosity within the matrix polymer of the coating increased by 2% to 3%. Increasing relative amounts of SDS in the coating raised porosity in the polymer binder portion of the coating. Porosity increases greater than 25% may be installed. Pore sizes installed in the PDMS ranged from about 5 µm to about 50 µm depending on the amount or concentration of SDS solution added to the PDMS. Sugar, salt, and SDS installed in the coating can be extracted from the cured coating simply by applying water or other polar solvents that leaves open pores behind in the coating. Ultrasonic vibration can assist with the extraction of pore-forming materials that enhances the coating porosity. Alcohols such as methanol that have good wetting and penetration properties can assist the extraction of the pore-forming materials from the polymer matrix. Once pore-forming materials are extracted, porosity within the coating can be infused with lubricant to form the LIS coating with enhanced LIS properties.

Example 9

Enhanced Anti-Fouling Performance with Addition of Biocidal Materials

Coatings of the present invention may include biocides. Enhancing porosity of these coatings allows biocidal materials to be incorporated as components of the coating compositions that form hydrophobic coatings and LIS coatings. As biocides leach from the coating, the biocides prevent fouling organisms from colonizing on the surface of the coatings thereby improving antifouling properties and performance of the coatings.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A process, comprising the step of:
dispensing a paintable fluid comprising porous first particles of a first material of a first selected size, second particles of a second material of a second smaller size, and a pore forming material, combined in a selected polymer to a substrate forming a hydrophobic coating thereon with a selected surface morphology comprising mounded features of a third selected size comprised of aggregates of the first particles overlaid with a layer of the second particles that provide the coating with a nanotextured surface, the pore forming material configured to enhance porosity within a polymer matrix of the hydrophobic coating.

2. The process of claim 1, wherein the first particles comprise mesoporous or nanoporous silica, the second particles comprise nanoparticles or nanofibers of fumed silica, and the polymer is a polydisiloxane polymer.

3. The process of claim 1, wherein the dispensing includes dispensing the paintable fluid with a solvent, a gas, or a combination thereof.

4. The process of claim 1, further including delivering a lubricant to a surface of the hydrophobic coating to form a lubricant-infused surface (LIS) coating thereon.

5. The process of claim 4, wherein the lubricant is delivered to the surface of the hydrophobic coating through a wicking material in fluid contact with a lubricant reservoir attached to the substrate.

6. The process of claim 4, wherein the lubricant is delivered to the surface of the hydrophobic coating through a capillary device in fluid contact with an external lubricant reservoir.

7. The process of claim 4, wherein the LIS coating has a surface energy between about 15 mJ/m$^2$ and about 20 mJ/m$^2$.

8. The process of claim 4, wherein the LIS coating exhibits a water roll-off angle below about 5 degrees.

9. A hydrophobic coating prepared by the process of claim 1, comprising:
a matrix polymer comprising porous first particles of a first material of a first selected size, second particles of a second material of a second smaller size, and a pore forming material, dispersed therein disposed on a selected substrate or surface, the hydrophobic coating includes a selected surface morphology comprising mounded features of a third selected size comprised of aggregates of the first particles overlaid with a layer of the second particles that provide the coating with a nanotextured surface, the selected surface morphology providing a selected surface energy.

10. The coating of claim 9, wherein the coating is a super-hydrophobic coating.

11. The coating of claim 9, wherein the coating further includes a biocide within the polymer matrix of the coating.

12. The coating of claim 9, wherein the coating further includes a lubricant disposed on the surface thereof that forms a lubricant-infused surface coating.

13. The coating of claim 9, wherein the surface energy is below about 20 mJ/m$^2$.

14. A process for forming a lubricant-infused surface coating, comprising the steps of:
dispensing a dispensable fluid to a substrate or support comprising first particles of a first material of a first selected size, second particles of a second material of a second smaller size, and a pore forming material, combined in a selected polymer to form a first layer thereon, the first layer having with a selected surface morphology comprising mounded features of a third selected size comprised of aggregates of the first particles with a layer of the second particles that provide the first layer with a nanotextured surface; and
applying or delivering a lubricant to the surface of the first layer to form the lubricant-infused surface coating thereon with a selected surface energy and a selected water roll-off angle.

15. A hydrophobic coating composition, comprising:
a paintable fluid comprising first particles of a first material of a first selected size, second particles of a second material of a second smaller size, and a pore forming material, in a matrix polymer combined in a selected solvent that enables dissemination or application to a substrate over a selected coverage area that forms a porous hydrophobic coating thereon when delivered thereto, the hydrophobic coating comprising mounded features of a third selected size comprised of aggregates of the first particles overlaid with a layer of the second particles that provide the hydrophobic coating with a nanotextured surface.

16. The hydrophobic coating composition of claim 15, wherein the first and second particles comprise a material selected from the group consisting of: silica, metals, metal oxides, ceramics, polymers, diatomaceous earth, and combinations thereof.

17. The hydrophobic coating composition of claim 15, wherein the first particles are comprised of mesoporous or nanoporous silica, the second particles are comprised of nanoparticles or nanofibers of fumed silica, and the matrix polymer is a polydimethylsiloxane polymer.

18. The hydrophobic coating composition of claim 15, further including a biocide.

* * * * *